US006193158B1

(12) United States Patent
Hecht et al.

(10) Patent No.: US 6,193,158 B1
(45) Date of Patent: Feb. 27, 2001

(54) HIGH SPEED IMAGE ACQUISITION SYSTEM AND METHOD

(75) Inventors: Kurt Hecht, Hartsville; Milorad Neskovic, Hatfield; Vasanth Shreesha, Quakertown, all of PA (US); Edward Cohen, Mt. Laurel, NJ (US)

(73) Assignee: Accu-Sort Systems, Inc., Telford, PA (US)

( * ) Notice: Subject to any disclaimer, the term of this patent is extended or adjusted under 35 U.S.C. 154(b) by 0 days.

(21) Appl. No.: 09/483,154

(22) Filed: Jan. 14, 2000

Related U.S. Application Data

(63) Continuation of application No. 09/287,448, filed on Apr. 7, 1999, now Pat. No. 6,015,089, which is a continuation of application No. 08/660,152, filed on Jun. 3, 1996, now Pat. No. 5,969,325.

(51) Int. Cl.$^{7}$ .......................................................... G06K 7/10

(52) U.S. Cl. ............................... 235/462.16; 235/462.25; 235/470; 382/199; 382/296

(58) Field of Search .......................... 235/462.16, 462.11, 235/462.12, 462.19, 462.25, 462.41, 454, 494; 382/199, 296

(56) References Cited

U.S. PATENT DOCUMENTS 3,599,151 8/1971 Harr ................................. 340/146.3
3,675,201 7/1972 McKissick et al. .............. 340/146.3
4,143,356 3/1979 Nally ............................... 235/449 X
4,356,389 10/1982 Quirey et al. ........................ 235/455
4,468,704 8/1984 Stoffel et al. ........................ 358/282
4,525,747 6/1985 Sakai et al. .......................... 358/284
4,856,076 8/1989 Maeda ............................. 382/453 X
5,159,340 10/1992 Smith .............................. 235/463 X
5,189,710 2/1993 Holt ....................................... 382/22
5,296,940 3/1994 Kawashima .......................... 358/455
5,373,147 12/1974 Noda .......................... 235/462.16 X
5,389,770 2/1995 Ackley ........................... 235/462.16
5,486,689 1/1996 Ackley ................................ 235/463
5,487,115 1/1996 Surka .................................. 382/296
5,510,604 4/1996 England ...................... 235/462.16 X
5,514,858 5/1996 Ackley ........................ 235/462.16 X
5,576,532 11/1996 Hecht .................................. 235/494
5,694,102 12/1997 Hecht .................................. 235/456
5,902,987 5/1999 Coffman .......................... 235/462.12
5,969,325 * 10/1999 Hecht et al. .................... 235/462.16
6,015,089 * 1/2000 Hecht et al. .................... 235/462.16

FOREIGN PATENT DOCUMENTS 0385478 9/1990 (EP) ............................... G06K/7/10
0685478 9/1990 (EP) ............................... G06K/7/00
0498678A2 * 8/1992 (EP) .
0582911 2/1994 (EP) ............................... G06K/7/14
3-126185 5/1991 (JP) ............................... G06K/7/10

* cited by examiner

*Primary Examiner*—Michael G Lee
(74) *Attorney, Agent, or Firm*—Volpe & Koenig, P.C.

(57) ABSTRACT

A system for high speed acquisition and decoding of a barcode symbol locates potential barcode candidates within a scanned image and filters the candidates to eliminate invalid data. The system permits computational resources to be focused on decoding information most likely to be an actual barcode symbol. Once a potential barcode candidate has been located, the barcode symbol is processed to determine the barcode orientation and symbology. Each element of the barcode symbol is then located, even if all elements are not visible in the original image, and the barcode symbol is decoded in accordance with the specific symbology.

19 Claims, 30 Drawing Sheets

SPECULAR REFLECTION

TABLE 1

BLACK MARK

| B | S | | | B | | | S | | | B | | | S | | B | | | S | | | | B | | S | B | | S | | |
|---|---|---|---|---|---|---|---|---|---|---|---|---|---|---|---|---|---|---|---|---|---|---|---|---|---|---|---|---|---|
| 247 | 255 | 250 | 195 | 139 | 114 | 113 | 134 | 127 | 87 | 69 | 71 | 89 | 104 | 74 | 56 | 58 | 77 | 117 | 135 | 125 | 92 | 71 | 82 | 73 | 61 | 78 | 92 | 85 | 63 |
| 118 | 140 | 125 | 93 | 56 | 43 | 43 | 62 | 67 | 49 | 36 | 36 | 43 | 54 | 40 | 27 | 24 | 27 | 33 | 35 | 43 | 42 | 34 | 43 | 48 | 45 | 60 | 85 | 93 | 84 |
| 48 | 53 | 45 | 30 | 14 | 13 | 16 | 27 | 36 | 31 | 23 | 27 | 36 | 55 | 50 | 36 | 35 | 47 | 82 | 115 | 124 | 107 | 79 | 86 | 95 | 84 | 97 | 134 | 146 | 132 |
| 82 | 108 | 118 | 100 | 65 | 46 | 48 | 66 | 87 | 77 | 53 | 51 | 67 | 95 | 91 | 61 | 57 | 70 | 110 | 152 | 168 | 146 | 106 | 103 | 119 | 101 | 112 | 148 | 166 | 155 |
| 134 | 172 | 186 | 163 | 115 | 82 | 79 | 92 | 122 | 108 | 83 | 73 | 81 | 106 | 110 | 79 | 64 | 73 | 106 | 148 | 169 | 155 | 113 | 102 | 119 | 106 | 103 | 145 | 166 | 159 |
| 140 | 163 | 145 | 101 | 62 | 54 | 65 | 98 | 102 | 66 | 56 | 58 | 90 | 105 | 78 | 61 | 71 | 103 | 152 | 174 | 160 | 120 | 98 | 112 | 105 | 97 | 128 | 162 | 160 | 130 |
| 132 | 157 | 153 | 111 | 66 | 50 | 62 | 88 | 100 | 68 | 53 | 56 | 77 | 105 | 82 | 58 | 56 | 80 | 127 | 157 | 153 | 119 | 93 | 100 | 104 | 90 | 113 | 140 | 150 | 125 |
| 122 | 151 | 159 | 123 | 79 | 54 | 57 | 76 | 102 | 78 | 57 | 53 | 71 | 93 | 87 | 61 | 55 | 67 | 110 | 152 | 157 | 130 | 94 | 99 | 112 | 97 | 107 | 138 | 152 | 140 |
| 112 | 144 | 155 | 134 | 89 | 59 | 57 | 74 | 100 | 86 | 60 | 55 | 67 | 91 | 93 | 66 | 56 | 66 | 98 | 138 | 158 | 145 | 112 | 98 | 112 | 103 | 101 | 136 | 161 | 145 |
| 139 | 172 | 196 | 184 | 149 | 113 | 108 | 114 | 146 | 148 | 119 | 108 | 114 | 138 | 157 | 139 | 125 | 136 | 170 | 243 | 255 | 255 | 255 | 255 | 255 | 246 | 195 | 185 | 197 | 180 |

BEFORE

SPECULAR REFLECTION

TABLE 2

| B | S | | | B | | | S | | | B | | | S | | B | | | S | | | | B | | S | B | | S | | |
|---|---|---|---|---|---|---|---|---|---|---|---|---|---|---|---|---|---|---|---|---|---|---|---|---|---|---|---|---|---|
| 247 | 255 | 250 | 195 | 149 | 114 | 113 | 134 | 146 | 148 | 119 | 108 | 114 | 138 | 157 | 139 | 125 | 136 | 170 | 243 | 255 | 255 | 255 | 255 | 255 | 246 | 195 | 185 | 197 | 180 |
| 140 | 172 | 196 | 184 | 139 | 113 | 108 | 114 | 127 | 108 | 83 | 73 | 90 | 106 | 110 | 79 | 71 | 103 | 152 | 174 | 169 | 155 | 113 | 112 | 119 | 106 | 128 | 162 | 166 | 159 |
| 139 | 172 | 186 | 163 | 115 | 82 | 79 | 98 | 122 | 87 | 69 | 71 | 89 | 105 | 93 | 66 | 64 | 80 | 127 | 157 | 168 | 146 | 112 | 103 | 119 | 103 | 113 | 148 | 166 | 155 |
| 134 | 163 | 159 | 134 | 89 | 59 | 65 | 92 | 102 | 86 | 60 | 58 | 81 | 105 | 91 | 61 | 58 | 77 | 117 | 152 | 160 | 145 | 106 | 102 | 112 | 101 | 112 | 145 | 161 | 145 |
| 132 | 157 | 155 | 123 | 79 | 54 | 62 | 88 | 102 | 78 | 57 | 56 | 77 | 104 | 87 | 61 | 57 | 73 | 110 | 152 | 158 | 130 | 98 | 100 | 112 | 97 | 107 | 140 | 160 | 140 |
| 122 | 151 | 153 | 111 | 66 | 54 | 57 | 76 | 100 | 77 | 56 | 55 | 71 | 95 | 82 | 61 | 56 | 70 | 110 | 148 | 157 | 120 | 94 | 99 | 105 | 97 | 103 | 138 | 152 | 132 |
| 118 | 144 | 145 | 101 | 65 | 50 | 57 | 74 | 100 | 68 | 53 | 53 | 67 | 93 | 78 | 58 | 56 | 67 | 106 | 138 | 153 | 119 | 93 | 98 | 104 | 90 | 101 | 136 | 150 | 130 |
| 112 | 140 | 125 | 100 | 62 | 46 | 48 | 66 | 87 | 66 | 53 | 51 | 67 | 91 | 74 | 56 | 55 | 66 | 98 | 135 | 125 | 107 | 79 | 86 | 95 | 84 | 97 | 134 | 146 | 125 |
| 82 | 108 | 118 | 93 | 56 | 43 | 43 | 62 | 67 | 49 | 36 | 36 | 43 | 55 | 50 | 36 | 35 | 47 | 82 | 115 | 124 | 92 | 71 | 82 | 73 | 61 | 78 | 92 | 93 | 84 |
| 48 | 53 | 45 | 30 | 14 | 13 | 16 | 27 | 36 | 31 | 23 | 27 | 36 | 54 | 40 | 27 | 24 | 27 | 33 | 35 | 43 | 42 | 34 | 43 | 48 | 45 | 60 | 85 | 85 | 63 |

AFTER 10
12
LIGHT SOURCE
18
780070 704411
20
DETECTOR
22
PROCESSOR
24
OUTPUT

40

42
DIVIDE IMAGE INTO BLOCKS
43
PERFORM GRID LINE ANALYSIS
44
SELECT A TRIGGER LINE
46
SEARCH FOR POTENTIAL BAR CODE CANDIDATES
E
48
FILTER
50
VERIFY CANDIDATE BY MATCHING WITH NEIGHBORING GRID LINES
52
TRACE EDGE-HEIGHT AND CURVATURE CHECK
53
HAVE BOTH ENDS OF B.C. BEEN DETECTED?
YES
NO
B
A
D
C

FIG.2C
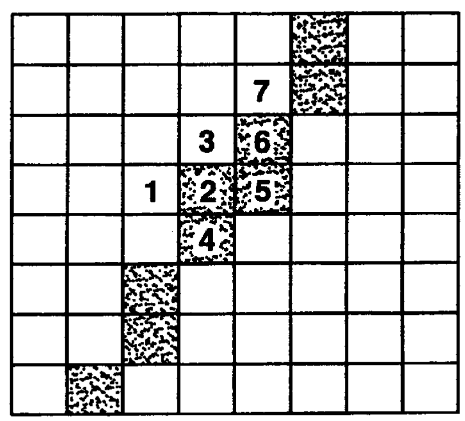
FIG.2D
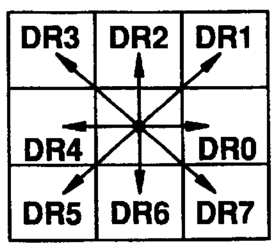
FIG.2E
| | | |
|---|---|---|
| DR3 ↓ DR0 | DR2 ↓ DR7 | DR1 ↓ DR6 |
| DR4 ↓ DR1 | | DR0 ↓ DR6 |
| DR5 ↓ DR2 | DR6 ↓ DR3 | DR7 ↓ DR4 |
FIG.2F
| | | |
|---|---|---|
| DR3 ↓ DR6 | DR2 ↓ DR5 | DR1 ↓ DR4 |
| DR4 ↓ DR7 | | DR0 ↓ DR3 |
| DR5 ↓ DR0 | DR6 ↓ DR1 | DR7 ↓ DR2 |

A
HAVE 10 PASSES BEEN MADE ?
216
NO
YES
DATA REORGANIZED FOR SPECULAR REPROCESSING?
218
NO
YES
REORGANIZE LINE DATA FOR SPECULAR PREPROCESSING
220
HAVE 15 PASSES BEEN MADE ?
222
NO
YES
RETURN NO READ SIGNAL
224
B

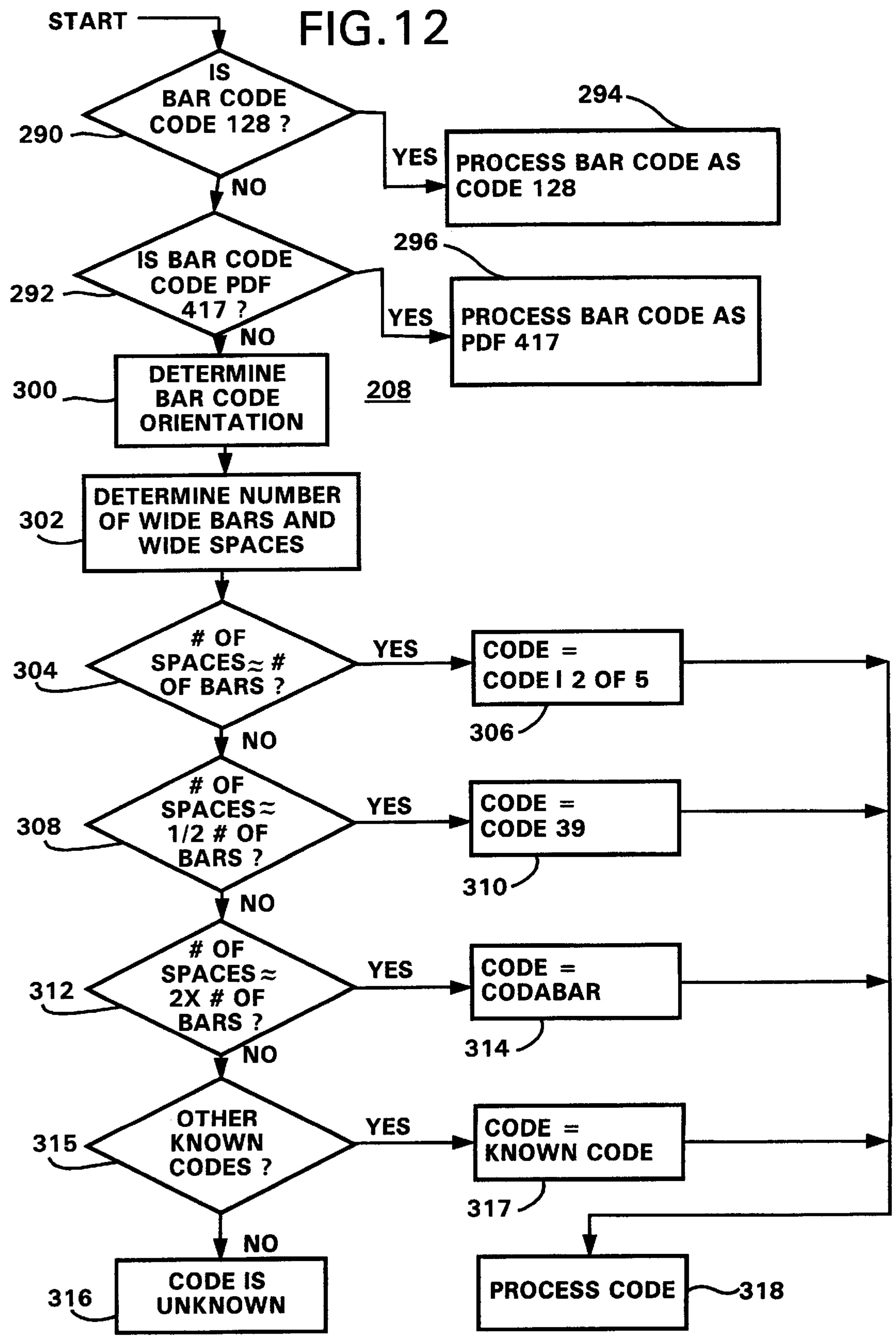
FIG. 12
START
IS BAR CODE CODE 128 ?
290
YES
NO
294
PROCESS BAR CODE AS CODE 128
IS BAR CODE CODE PDF 417 ?
292
YES
NO
296
PROCESS BAR CODE AS PDF 417
300
DETERMINE BAR CODE ORIENTATION
208
302
DETERMINE NUMBER OF WIDE BARS AND WIDE SPACES
304
OF SPACES≈ # OF BARS ?
YES
NO
CODE = CODE I 2 OF 5
306
308
OF SPACES≈ 1/2 # OF BARS ?
YES
NO
CODE = CODE 39
310
312
OF SPACES≈ 2X # OF BARS ?
YES
NO
CODE = CODABAR
314
315
OTHER KNOWN CODES ?
YES
NO
CODE = KNOWN CODE
317
316
CODE IS UNKNOWN
PROCESS CODE
318

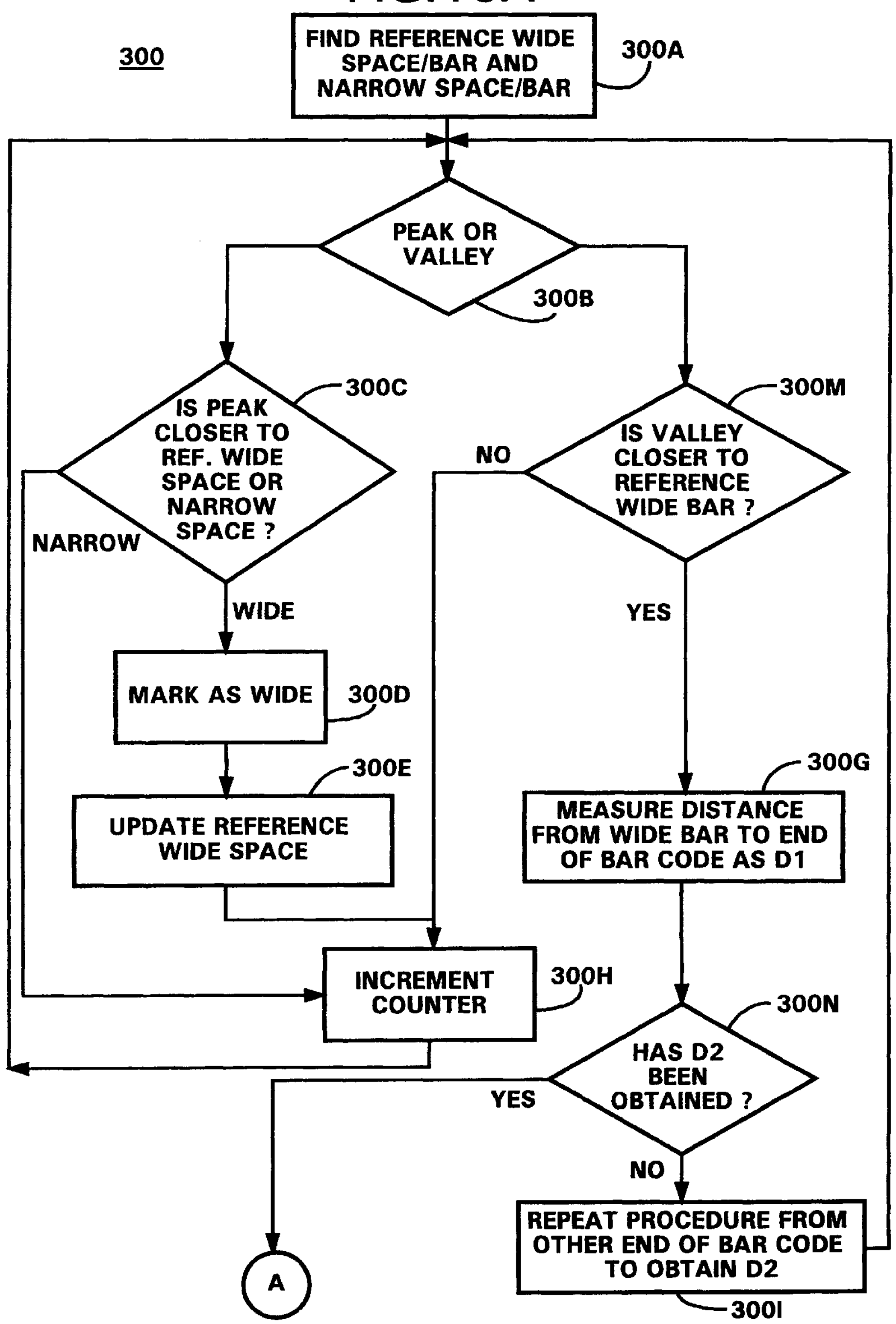
FIG.13A
300
FIND REFERENCE WIDE SPACE/BAR AND NARROW SPACE/BAR
300A
PEAK OR VALLEY
300B
IS PEAK CLOSER TO REF. WIDE SPACE OR NARROW SPACE ?
300C
NARROW
WIDE
MARK AS WIDE
300D
UPDATE REFERENCE WIDE SPACE
300E
INCREMENT COUNTER
300H
IS VALLEY CLOSER TO REFERENCE WIDE BAR ?
300M
NO
YES
MEASURE DISTANCE FROM WIDE BAR TO END OF BAR CODE AS D1
300G
HAS D2 BEEN OBTAINED ?
300N
YES
NO
REPEAT PROCEDURE FROM OTHER END OF BAR CODE TO OBTAIN D2
300I
A 302
DETERMINE LOCATION OF WIDE AND NARROW BARS AND SPACES
500
PEAK/SPACE
VALLEY/BAR
PEAK OR VALLEY ?
502
512
IS PEAK CLOSER TO REF. WIDE SPACE OR NARROW SPACE ?
504
NARROW
IS VALLEY CLOSER TO REFERENCE WIDE BAR OR NARROW BAR ?
NARROW
WIDE
WIDE
MARK AS WIDE
506
514
MARK AS WIDE
UPDATE REFERENCE WIDE SPACE
508
516
UPDATE REFERENCE WIDE BAR
INCREMENT PEAK COUNTER
510

210
A
DIVIDE SCAN LINE DATA INTO CHARACTER SEGMENTS
603
MARK REQ'D NUMBER OF HIGHEST PEAKS AS WIDE SPACES AND LOWEST VALLEYS AS WIDE BARS
401
MEASURE DISTANCE BETWEEN WIDE ELEMENTS AND CALC. # OF NARROW ELEMENTS BETWEEEN THEM
402
DECODE CHARACTER (OR CHARACTER PAIR)
403
HAVE ALL CHARACTERS BEEN PROCESSED ?
404
NO
YES
B
EXIT PROCEDURE
405

FIG.16F

TABLE 1

SPECULAR REFLECTION

BLACK MARK

| B | S | S | S | B | B | B | S | S | S | B | B | B | S | S | B | B | B | S | S | S | S | B | B | S | B | B | S | S | S |
|---|---|---|---|---|---|---|---|---|---|---|---|---|---|---|---|---|---|---|---|---|---|---|---|---|---|---|---|---|---|
| 247 | 255 | 250 | 195 | 139 | 114 | 113 | 134 | 127 | 87 | 69 | 71 | 89 | 104 | 74 | 56 | 58 | 77 | 117 | 135 | 125 | 92 | 71 | 82 | 73 | 61 | 78 | 92 | 85 | 63 |
| 118 | 140 | 125 | 93 | 56 | 43 | 43 | 62 | 67 | 49 | 36 | 36 | 43 | 54 | 40 | 27 | 24 | 27 | 33 | 35 | 43 | 42 | 34 | 43 | 48 | 45 | 60 | 85 | 93 | 84 |
| 48 | 53 | 45 | 30 | 14 | 13 | 16 | 27 | 36 | 31 | 23 | 27 | 36 | 55 | 50 | 36 | 35 | 47 | 82 | 115 | 124 | 107 | 79 | 86 | 95 | 84 | 97 | 134 | 146 | 132 |
| 82 | 108 | 118 | 100 | 65 | 46 | 48 | 66 | 87 | 77 | 53 | 51 | 67 | 95 | 91 | 61 | 57 | 70 | 110 | 152 | 168 | 146 | 106 | 103 | 119 | 101 | 112 | 148 | 166 | 155 |
| 134 | 172 | 186 | 163 | 115 | 82 | 79 | 92 | 122 | 108 | 83 | 73 | 81 | 106 | 110 | 79 | 64 | 73 | 106 | 148 | 169 | 155 | 113 | 102 | 119 | 106 | 103 | 145 | 166 | 159 |
| 140 | 163 | 145 | 101 | 62 | 54 | 65 | 98 | 102 | 66 | 56 | 58 | 90 | 105 | 78 | 61 | 71 | 103 | 152 | 174 | 160 | 120 | 98 | 112 | 105 | 97 | 128 | 162 | 160 | 130 |
| 132 | 157 | 153 | 111 | 66 | 50 | 62 | 88 | 100 | 68 | 53 | 56 | 77 | 105 | 82 | 58 | 56 | 80 | 127 | 157 | 153 | 119 | 93 | 100 | 104 | 90 | 113 | 140 | 150 | 125 |
| 122 | 151 | 159 | 123 | 79 | 54 | 57 | 76 | 102 | 78 | 57 | 53 | 71 | 93 | 87 | 61 | 55 | 67 | 110 | 152 | 157 | 130 | 94 | 99 | 112 | 97 | 107 | 138 | 152 | 140 |
| 112 | 144 | 155 | 134 | 89 | 59 | 57 | 74 | 100 | 86 | 60 | 55 | 67 | 91 | 93 | 66 | 56 | 66 | 98 | 138 | 158 | 145 | 112 | 98 | 112 | 103 | 101 | 136 | 161 | 145 |
| 139 | 172 | 196 | 184 | 149 | 113 | 108 | 114 | 146 | 148 | 119 | 108 | 114 | 138 | 157 | 139 | 125 | 136 | 170 | 243 | 255 | 255 | 255 | 255 | 255 | 246 | 195 | 185 | 197 | 180 |

BEFORE

SPECULAR REFLECTION

FIG.16G

TABLE 2

| B | S | S | S | B | B | B | S | S | S | B | B | B | S | S | B | B | B | S | S | S | S | B | B | S | B | B | S | S | S |
|---|---|---|---|---|---|---|---|---|---|---|---|---|---|---|---|---|---|---|---|---|---|---|---|---|---|---|---|---|---|
| 247 | 255 | 250 | 195 | 149 | 114 | 113 | 134 | 146 | 148 | 119 | 108 | 114 | 138 | 157 | 139 | 125 | 136 | 170 | 243 | 255 | 255 | 255 | 255 | 255 | 246 | 195 | 185 | 197 | 180 |
| 140 | 172 | 196 | 184 | 139 | 113 | 108 | 114 | 127 | 108 | 83 | 73 | 90 | 106 | 110 | 79 | 71 | 103 | 152 | 174 | 169 | 155 | 113 | 112 | 119 | 106 | 128 | 162 | 166 | 159 |
| 139 | 172 | 186 | 163 | 115 | 82 | 79 | 98 | 122 | 87 | 69 | 71 | 89 | 105 | 93 | 66 | 64 | 80 | 127 | 157 | 168 | 146 | 112 | 103 | 119 | 103 | 113 | 148 | 166 | 155 |
| 134 | 163 | 159 | 134 | 89 | 59 | 65 | 92 | 102 | 86 | 60 | 58 | 81 | 105 | 91 | 61 | 58 | 77 | 117 | 152 | 160 | 145 | 106 | 102 | 112 | 101 | 112 | 145 | 161 | 145 |
| 132 | 157 | 155 | 123 | 79 | 54 | 62 | 88 | 102 | 78 | 57 | 56 | 77 | 104 | 87 | 61 | 57 | 73 | 110 | 152 | 158 | 130 | 98 | 100 | 112 | 97 | 107 | 140 | 160 | 140 |
| 122 | 151 | 153 | 111 | 66 | 54 | 57 | 76 | 100 | 77 | 56 | 55 | 71 | 95 | 82 | 61 | 56 | 70 | 110 | 148 | 157 | 120 | 94 | 99 | 105 | 97 | 103 | 138 | 152 | 132 |
| 118 | 144 | 145 | 101 | 65 | 50 | 57 | 74 | 100 | 68 | 53 | 53 | 67 | 93 | 78 | 58 | 56 | 67 | 106 | 138 | 153 | 119 | 93 | 98 | 104 | 90 | 101 | 136 | 150 | 130 |
| 112 | 140 | 125 | 100 | 62 | 46 | 48 | 66 | 87 | 66 | 53 | 51 | 67 | 91 | 74 | 56 | 55 | 66 | 98 | 135 | 125 | 107 | 79 | 86 | 95 | 84 | 97 | 134 | 146 | 125 |
| 82 | 108 | 118 | 93 | 56 | 43 | 43 | 62 | 67 | 49 | 36 | 36 | 43 | 55 | 50 | 36 | 35 | 47 | 82 | 115 | 124 | 92 | 71 | 82 | 73 | 61 | 78 | 92 | 93 | 84 |
| 48 | 53 | 45 | 30 | 14 | 13 | 16 | 27 | 36 | 31 | 23 | 27 | 36 | 54 | 40 | 27 | 24 | 27 | 33 | 35 | 43 | 42 | 34 | 43 | 48 | 45 | 60 | 85 | 85 | 63 |

AFTER

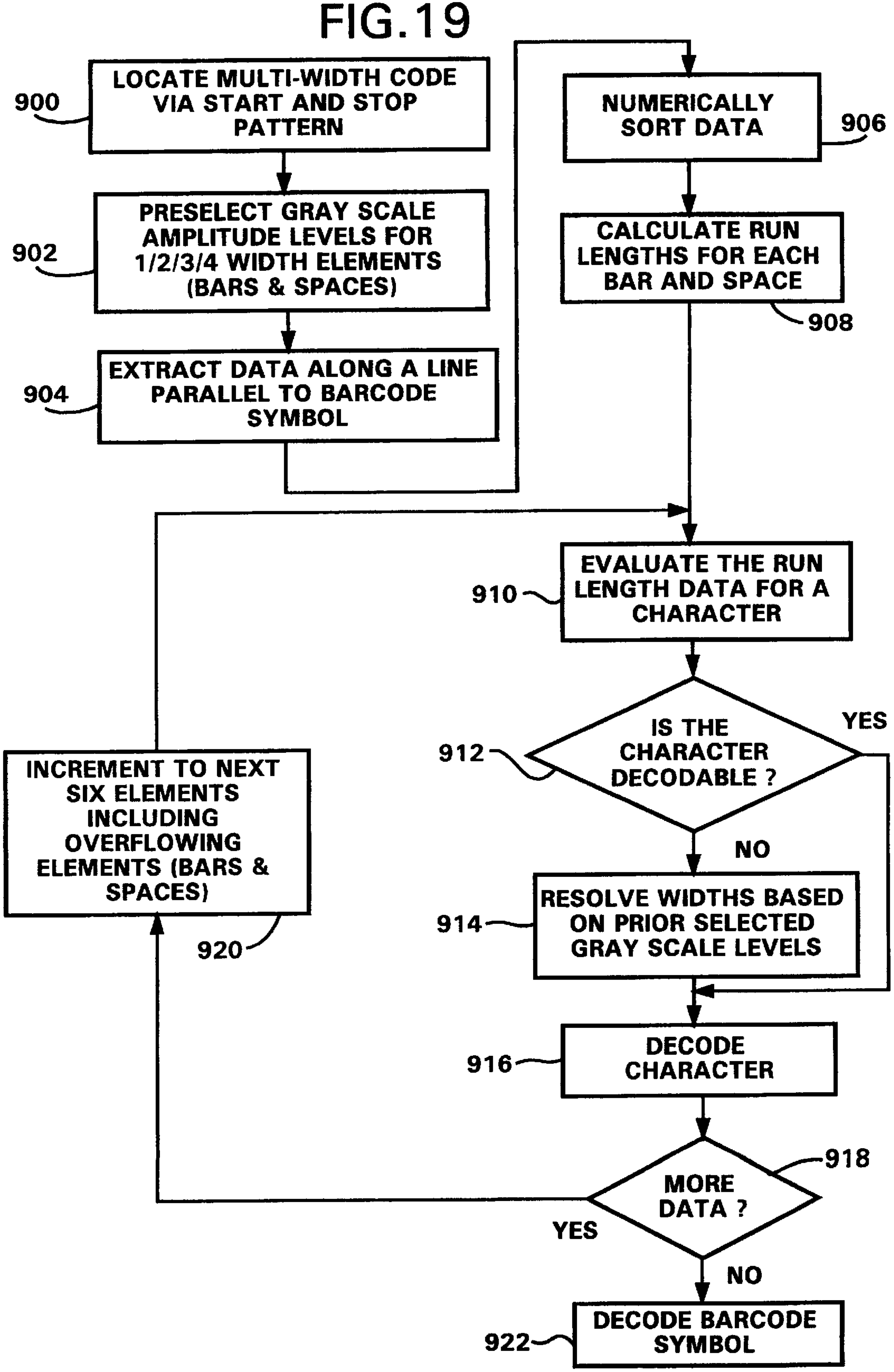
FIG.19
LOCATE MULTI-WIDTH CODE VIA START AND STOP PATTERN
900
PRESELECT GRAY SCALE AMPLITUDE LEVELS FOR 1/2/3/4 WIDTH ELEMENTS (BARS & SPACES)
902
EXTRACT DATA ALONG A LINE PARALLEL TO BARCODE SYMBOL
904
NUMERICALLY SORT DATA
906
CALCULATE RUN LENGTHS FOR EACH BAR AND SPACE
908
EVALUATE THE RUN LENGTH DATA FOR A CHARACTER
910
IS THE CHARACTER DECODABLE ?
912
YES
NO
RESOLVE WIDTHS BASED ON PRIOR SELECTED GRAY SCALE LEVELS
914
DECODE CHARACTER
916
MORE DATA ?
918
YES
NO
DECODE BARCODE SYMBOL
922
INCREMENT TO NEXT SIX ELEMENTS INCLUDING OVERFLOWING ELEMENTS (BARS & SPACES)
920

HIGH SPEED IMAGE ACQUISITION SYSTEM AND METHOD

CROSS-REFERENCES TO RELATED APPLICATIONS

This patent application is a continuation of U.S. patent application Ser. No. 09/287,448; filed on Apr. 7, 1999, now U.S. Pat. No. 6,015,089 which is a continuation of U.S. patent application Ser. No. 08/660,152, filed on Jun. 3, 1996, now U.S. Pat. No. 5,969,325.

BACKGROUND OF THE INVENTION

1. Field of the Invention

The present invention generally relates to a system and method for acquiring an image in the form of coded information symbols. More particularly, the present invention relates to a system and method for locating and decoding barcode symbols which may be partially obscured, poorly printed or contaminated.

2. Description of Prior Art

Barcode symbols are formed from bars or elements that are typically rectangular in shape with a variety of possible widths. The specific arrangement of elements defines a character according to a set of rules specified by the code or "symbology" used. To encode a desired sequence of characters, a collection of element arrangements are concatenated to form a complete barcode symbol, with each character of the message being represented by a unique group of elements. In some symbologies a unique "start" and "stop" character is also used to indicate where the barcode symbol begins and ends respectively. A number of different barcode symbologies exist, including UPC/EAN, Code 39, Code 128, Codabar, PDF417 and Interleaved 2 of 5.

Various optical readers and optical scanning systems have been developed for acquiring an image, such as a barcode symbol, appearing on the surface of an article and for reading and decoding the acquired barcode symbol. Scanning systems typically include a laser light source to illuminate the barcode symbol and a photodetector to detect light reflected from the symbol. Another common type of optical scanner incorporates a non-laser light source and a charge coupled device (CCD) detector. A portion of the light which is reflected off the symbol is detected by the CCD detector and converted into an electrical signal which provides a digital image of the barcode symbol that has been scanned. The digital image is then processed and decoded according to the specific barcode symbology used.

Most barcode symbols can be easily read in ideal conditions, such as when the barcode symbol is stationary, clearly visible and without flaws. However, when a barcode symbol is located on an object moving at a high speed, narrow bars and spaces cannot be easily located. Smearing of bars may result from low resolution imaging or high-speed motion of the barcode symbol in relation to the scanner. Extraneous markings or other contaminants may also partially obscure the barcode symbol.

An additional problem with many current scanners is that an attempt to decode a scan will fail if one or more characters in the sequence (including the start and stop characters) are not recognized as legitimate characters. Typically, the results of a partial decoding will not be saved. As a consequence, a variety of barcode symbols, including long barcode symbols with a short height, poorly printed barcode symbols, or barcode symbols which have been marred by extraneous markings, are impossible to decode unless repeated attempts are made by the operator to reorient the scanning line over the symbol. Barcode symbols may contain printing defects which are arranged such that it is impossible to obtain a single distortion free scan. Using conventional methods of decoding, such barcode symbols are unreadable since reading along any single scan line through the symbol would not result in a sequence of valid characters.

Accordingly, there exists a need for a scanner that quickly determines whether a scanned image is a valid barcode candidate and accurately decodes valid barcode candidates.

SUMMARY OF THE INVENTION

The present invention is an apparatus and method for high speed acquisition, location and decoding of a barcode symbol. The system locates a series of potential barcode candidates within a scanned image and filters the candidates to eliminate invalid data. This approach allows computational resources to be focused on decoding the information most likely to be an actual barcode symbol. Once a potential barcode candidate has been located, the barcode symbol is processed to determine the barcode symbol orientation and symbology. The elements within the barcode symbol are then detected and the barcode symbol is decoded in accordance with the specific symbology.

It is an object of the invention to provide a symbology locating and decoding system and method which accurately locate and decode barcode symbols while conserving computational resources.

Other objects and advantages will become apparent to those skilled in the art after reading the detailed description of a presently preferred embodiment.

BRIEF DESCRIPTION OF DRAWINGS

FIG. 2C–2F illustrates the tracing method in accordance with the present invention;

FIG. 12 is a flow diagram of the determination of the number of wide bars and wide spaces;

FIGS. 13A and 13B are flow diagrams of the method of determining the orientation of a barcode symbol;

FIG. 16F is a table containing gray scale values of the bar code symbol of FIG. 16A.

FIG. 16G is a table containing gray scale values of the bar code symbol of FIG. 16C.

FIG. 19 is a method of decoding a Code 128 barcode symbology;

DETAILED DESCRIPTION OF THE PREFERRED EMBODIMENT

Figure 1:
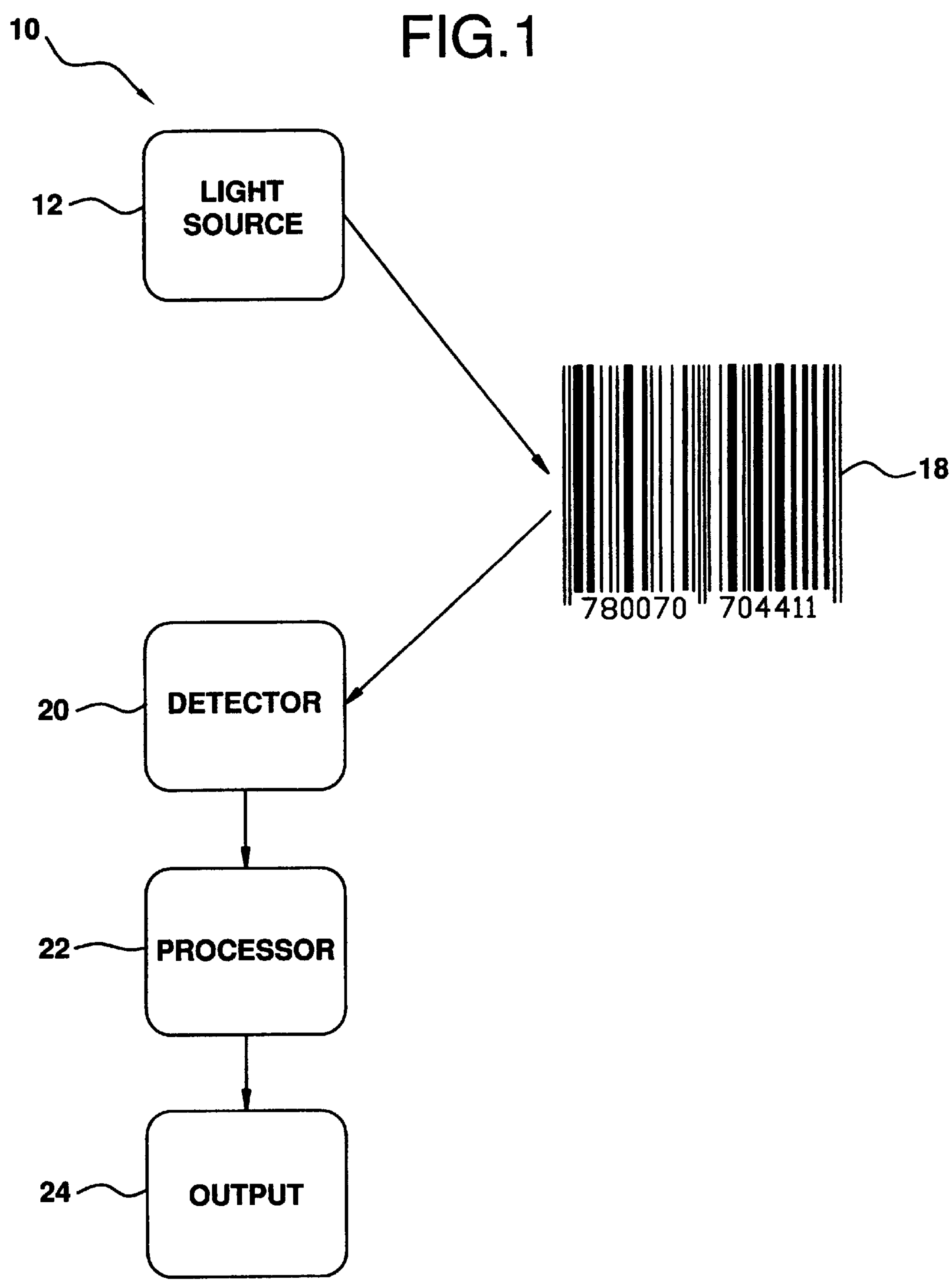
FIG. 1 is a barcode scanner made in accordance with the present invention.

The preferred embodiment will be described with reference to drawing figures where identical numerals represent the same elements throughout. Referring to FIG. 1, a barcode scanner 10 made in accordance with the present invention is shown. The scanning system 10 comprises a light source 12 which illuminates a subject barcode symbol 18. Light reflected from the barcode symbol 18 is detected by a photo-sensitive detector 20. The detector 20 produces an electrical signal representative of the light reflected from the barcode symbol 18 which is output to the processor 22. The processor 22 decodes the signal and forwards the resulting information, which corresponds to the information encoded in the barcode symbol 18 to an output means 24. The output means 24 may be a printer, a CRT or an information system as is well known by those skilled in the art.

The scanning system 10 shown in FIG. 1 may be embodied in a mobile hand-held unit, or may be a stationary unit wherein an object carrying the barcode symbol 18 is passed under the light source 12 either manually or via a conveyor. In the preferred embodiment, the detector 20 is a charge coupled device (CCD) one dimensional array (line) detector which detects and stores an electronic image of the barcode symbol 18. Additional detail regarding the scanning system 10 may be obtained with reference to currently pending U.S. Patent Application Serial No. (Not Yet Known) filed on Feb. 23, 1996 entitled "HIGH SPEED IMAGING APPARATUS FOR CCD BASED SCANNERS", assigned to the present assignee.

The scanning system 10 utilizes a two step approach to decoding barcode symbols: 1) locating valid barcode candidates on an object; and 2) determining the type of barcode symbology which has been detected and decoding the barcode symbol in accordance with that symbology.

Figure 2A:
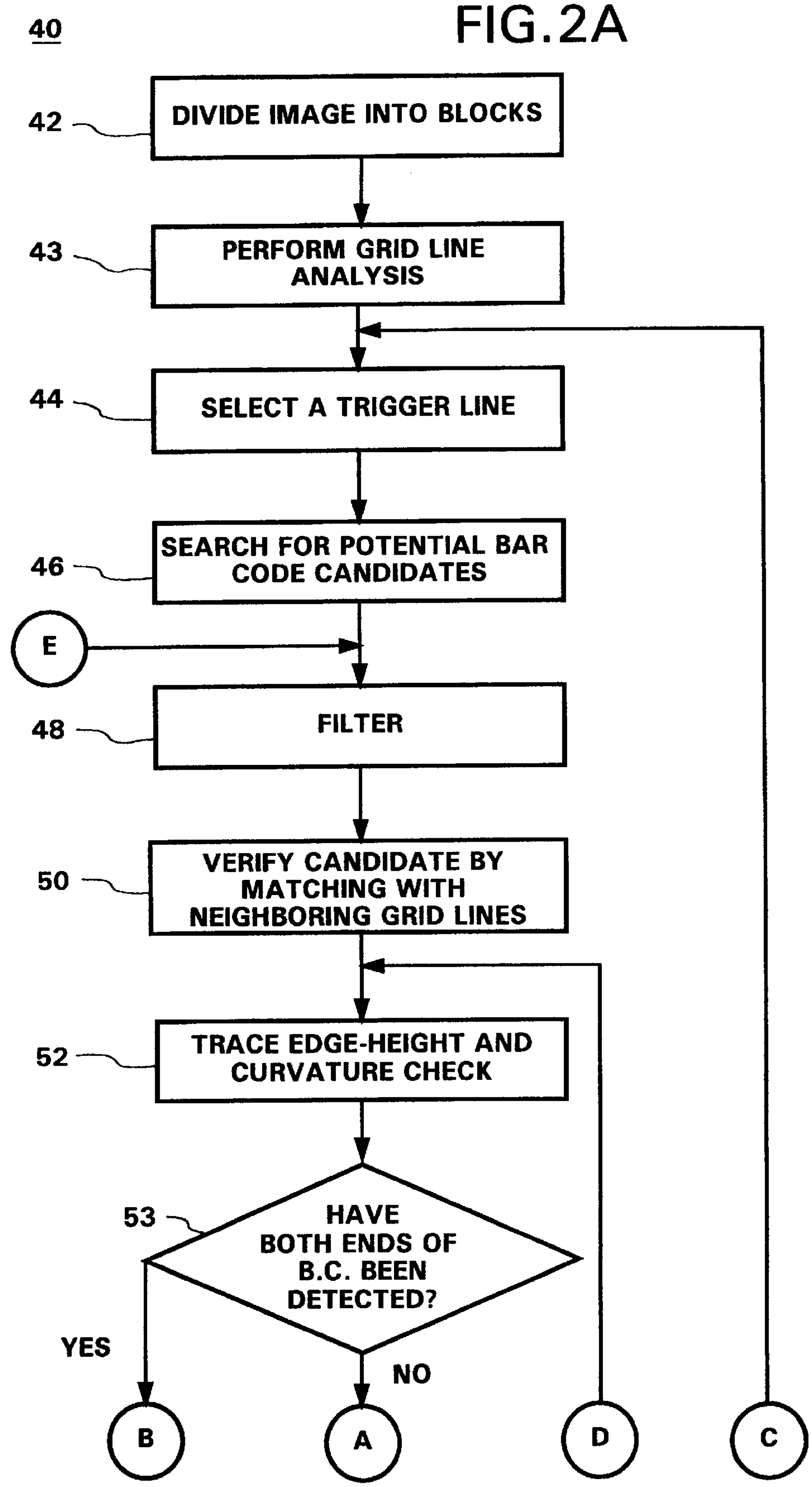
FIG. 2A and 2B are flow diagrams of the barcode symbol locating procedure in accordance with the present invention.
Figure 2B:
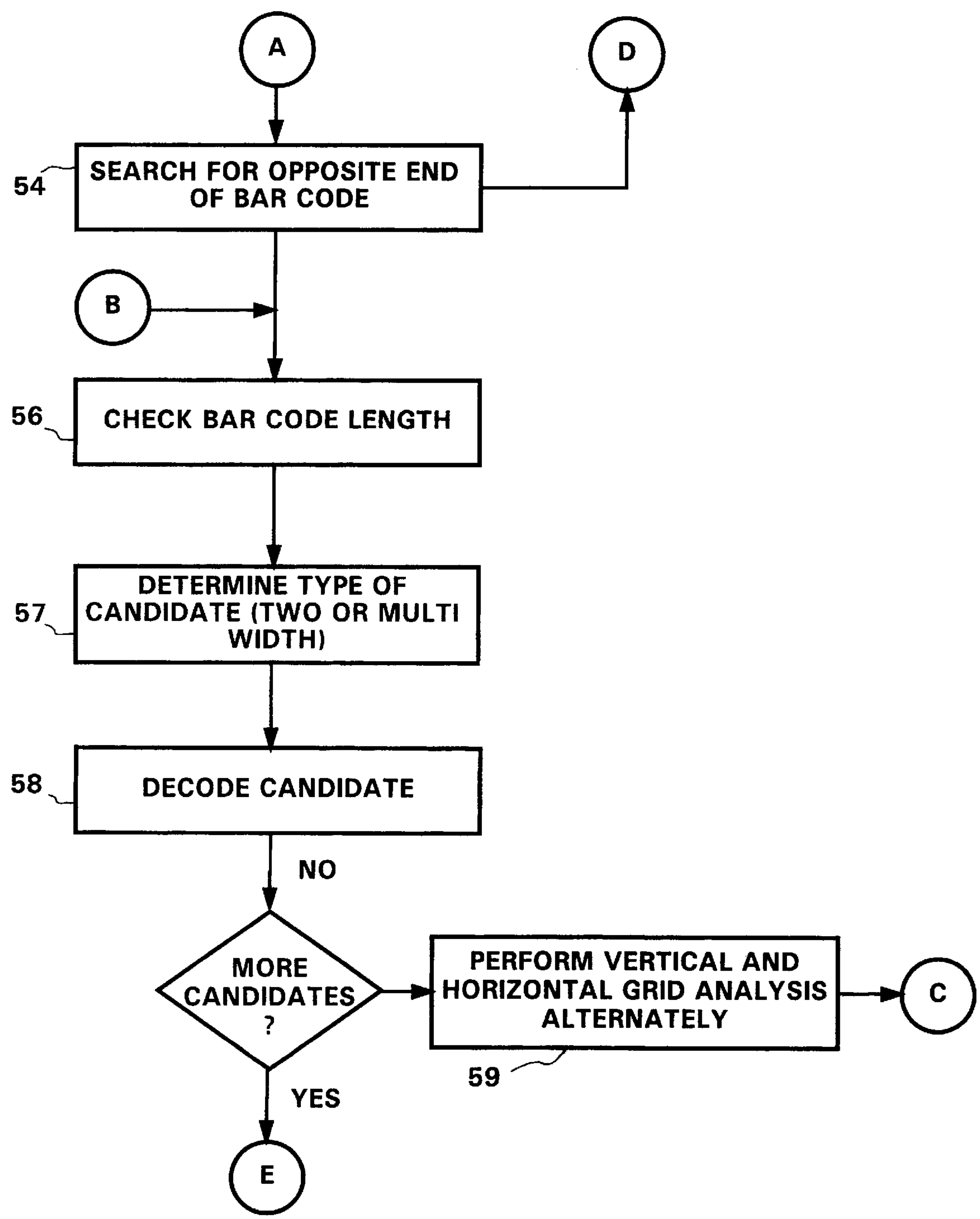
Figure 3:
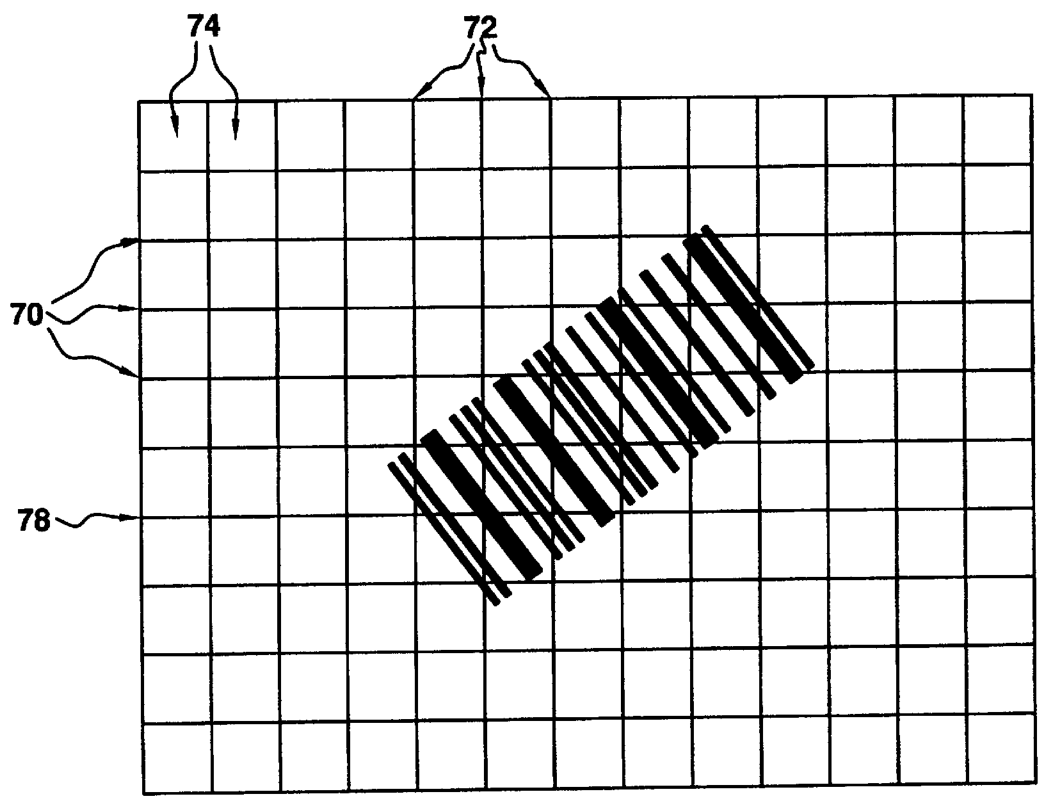
FIG. 3 shows the equally sized image blocks created by the horizontal and vertical grid lines.

Referring to FIGS. 2A and 2B, the system 10 performs a barcode symbol locating procedure 40 as shown. Light reflected from the barcode symbol 18 is detected by an array of light sensitive pixels within the CCD detector 20, thus creating an electronic image of the barcode symbol 18. Each pixel has a specific gray scale value which represents the amount of light detected by the pixel. The image is divided (step 42) into a grid having equally sized image blocks 74 (as shown in FIG. 3). The size of the blocks 74 depend on the height of the barcode symbol 18 and on the resolution of the image. As shown in FIG. 3, the equally sized image blocks 74 are created by horizontal grid lines 70 and vertical grid lines 72. In the preferred embodiment, the pixel array is 4096 by 1024 pixels and the horizontal and vertical grid lines 70, 72 are thirty-two pixels apart in the vertical and horizontal direction respectively. Although a smaller grid size will facilitate locating of smaller barcode symbols, it is computationally expensive.

Figure 4:
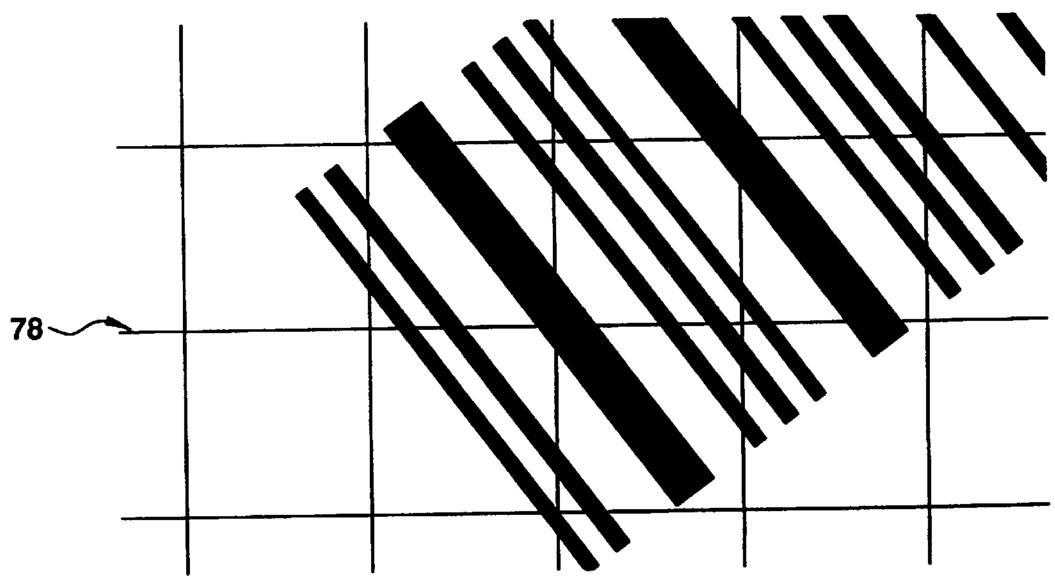
FIG. 4 is an enlarged view of a trigger line.

The system 10 begins searching for the barcode symbol by performing a series of grid line analyses. The horizontal grid lines (in a "picket fence" orientation) and vertical grid lines (in a "ladder" orientation) are analyzed to determine if a potential barcode candidate exists (step 43). A first grid line, called a "trigger line", for example, line 78 in FIGS. 3 and 4, is selected (step 44). Typically, the trigger line 78 is in the middle of the grid. The trigger line 78 is analyzed for potential barcode candidates (step 46) by seeking for a transition pattern along the trigger line 78 (skipping every other pixel to increase the speed). A transition pattern is defined as two successively chosen pixels having a gray scale magnitude difference of at least 20 (out of 255 gray scale levels). To qualify as an initial barcode candidate, the transition pattern must have a quiet zone of a minimum number of pixels followed by a "threshold" number of transitions within the selected length of pixels, such as at the beginning of a barcode symbol, or a threshold number of transitions within selected length of pixels followed by quiet zone, such as at the end of a barcode symbol. Preferably, the selected length of pixels is 140 in the vertical direction and 90 in the horizontal direction, the threshold number of transitions is 16 and the threshold quiet zone is a minimum of 20 pixels.

Successful barcode candidate locations comprising grid line and pixel coordinates are queued in a barcode candidate list. The sign (positive or negative) of the candidate position (x in case of horizontal search and y in case of vertical search) indicates whether the quiet zone of the candidate appeared prior to the transitions, indicating the beginning of a barcode symbol, or after the transitions, indicating the end of the barcode symbol.

Figure 5:
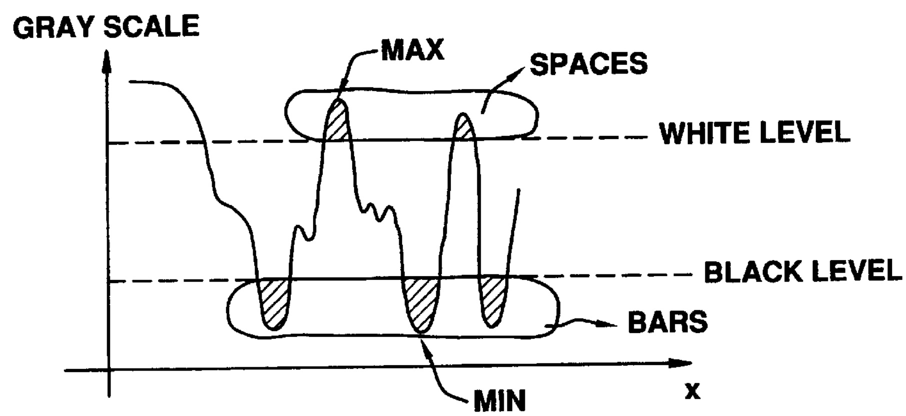
FIG. 5 is a diagram of the data from the trigger line.

After one or more potential barcode candidates have been detected (step 46) the candidates are filtered (step 48) to eliminate illegal candidates. In filtering the candidates (step 48), the system 10 analyzes a predetermined number of pixels along the trigger line 78, as shown in FIG. 5, and determines whether a threshold number of bars and spaces are present within that region. In one application, the threshold is two bars and two spaces in a region 65 pixels long. However, the threshold is dependent upon the specific application. The system 10 determines the number of bars and spaces by analyzing the region and determining black and white thresholds utilizing the following equations:

MIDPOINT=((MAX−MIN)*0.75)+MIN; (1)

DROP LEVEL=(MAX−MIN)*0.18; (2)

BLACK LEVEL THRESHOLD=MIDPOINT−DROP LEVEL; (3)

LEVEL THRESHOLD=MIDPOINT+DROP LEVEL; (4)

A bar is defined when successive pixels have a gray scale value less than the black level threshold and the number of pixels is greater than a predetermined minimum width. A space is defined when successive pixels have a gray scale value greater than the white level and the width is greater than a predetermined minimum width.

The number of bars and spaces in the region is then determined. If any bar is wider than the maximum width, the region fails because a wide bar in a barcode symbol cannot be greater than the maximum width. Although similar reasoning can be applied to a space, specular light reflection may "wash out" the CCD detector 20 in certain regions, thereby causing the detector 20 to interpret these washed out regions as spaces that are too wide. Accordingly, in the preferred embodiment, the width of spaces is not used to filter out potential candidates. Once the number of bars and spaces has been determined, it is compared to a threshold number. Any barcode candidate having less than the threshold number bars and spaces is discarded.

Figure 6:
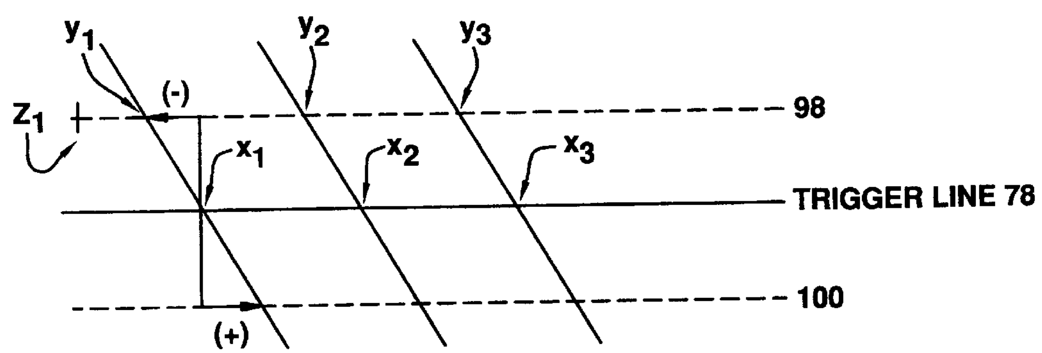
FIG. 6 illustrates selection of a neighboring scan line and comparison to the trigger line.

After a barcode candidate passes the filtering procedure (step 48), a verification is performed by matching pixels in adjacent scan lines to pixels in the trigger line 78 (step 50). The system 10 selects a neighboring scan line, for example line 98 in FIG. 6, that is a predetermined number of scans away from the trigger line 78; preferably eight pixels from the trigger line 78. The system 10 begins the matching process by collecting pixels starting at point $Z_1$, which is an offset of approximately 12 pixels to left of $X_1$. The first transition, a gray scale difference of 20, is identified at $Y_1$. Gray scale values of 40 pixels to the right of $Y_1$, are then collected ($Y_2 \ldots Y_{41}$) and compared with gray values of 40 pixels to right of $X_1\ X_2 \ldots X_{41}$). The mean of the absolute value of the difference is calculated using:

$$\frac{ABS(Y_1 - X_1) + ABS(Y_2 - X_2) + \ldots ABS(Y_N - X_N)}{N} < ERR \qquad (5)$$

(N=# pixels compared; preferably N=40). If this value is less than 25, the error constant, the candidate has passed the matching test. If the adjacent scan line 98 fails to match the trigger line 78, a second scan line 100 on the other side of the trigger line 78 is selected. If this second scan line 100 fails the matching test (step 50), the candidate is rejected.

At this point, barcode candidates have been selected and confirmed as the beginning of a detected barcode symbol 18. The system 10 must then analyze the first wide bar to ensure that the bar is not too tall, too short and also that the bar does not curve (step 52). The leading edge of the bar is traced to the top of the bar and to the bottom of the bar to define the first two corners of the barcode symbol. The tracing procedure will be described with reference to FIGS. 2C–2F. Preferably, the height is compared to a predetermined threshold to determine whether the bar is too tall or too short.

Referring to FIG. 2C, the system 10 begins tracing the detected bar at point 1. The initial direction of travel depends upon whether the barcode candidate was located from the horizontal search or the vertical search and on sign of the barcode candidate. For example, consider a horizontal candidate with a negative sign. The system 10 starts at point 1, which is in a quiet zone, and traverses from the quiet zone to the detected bar in direction DRO, as shown in the mapping table in FIG. 2D.

To trace and determine the two end points of a bar element, the system 10 must travel in the clockwise (DR0, DR7, . . . DR1) and counter-clockwise (DR0, DR1, . . . DR7) directions. Referring to FIG. 2C, the system 10 initially moves in direction DRO and detects a black pixel at point 2, a pixel having a gray scale value less than the black level threshold of Equation 3. Initially, the system 10 travels in the counter-clockwise direction. If the current pixel is a black pixel, the system 10 continues searching for a white pixel by incrementing the direction number to DR1. Accordingly, the system 10 will be at point 3, which is a white pixel. The gray scale value and coordinates of each pixel are stored in a buffer. The direction number is then remapped based on the table shown in FIG. 2E. The new direction number is DR6 since the last direction was DR1. The system 10 then traverses from point 3 to point 4. As soon as five points are stored in the buffer, the direction of a reference vector is calculated. For all other points traced, the system 10 calculates a vector direction. If the vector direction diverts from the reference vector by an error threshold, the third to the last point stored in the buffer is selected and marked as one of the corners.

The opposite end of the barcode element is found by tracing the element using the same procedure as described above, however, the system 10 moves in a clockwise direction using the mapping table shown in FIG. 2F. After the edge has been traced, the system 10 stores the coordinates of the first two corners of the barcode symbol for later use.

The system 10 initiates a search for the opposite end of the barcode symbol (step 54). The coordinates of a line perpendicular to the first edge are calculated and the system 10 moves along that perpendicular line while searching for another quiet zone. If a quiet zone has not been found within a reasonable distance, the barcode candidate is eliminated. The distance may be predetermined or may be based upon the height of the first bar, thereby maintaining a preset height-to-width aspect ratio. When the quiet zone is detected, the second edge is traced to detect height and curvature (step 52).

Figure 2G:
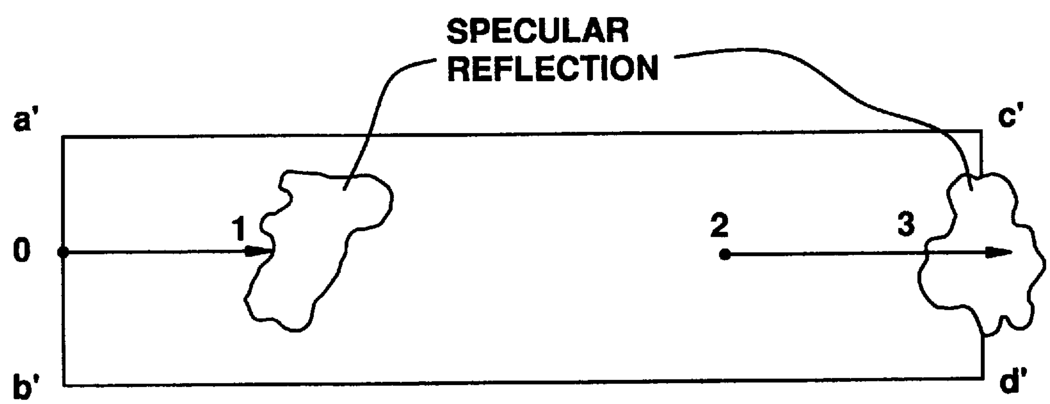
FIG. 2G shows the procedure for skipping to the end of a bar code to avoid speaker reflection.

The length of the barcode symbol is then checked (step 56) to ensure that it is within an expected value and the coordinates of the second two corners are stored. Referring briefly to FIG. 2G, if the label is washed out due to specular reflection, point "1" may falsely appear as a quiet zone. For fixed length barcodes, it may be preferable to skip a predetermined number of pixels to avoid specular reflections within the middle of the barcode symbol. As shown in FIG. 2G, the system 10 may skip to point "2" along the scan line to search for the last bar (c' d'). In this example, the last bar (c' d') will not be detected and steps 52 and 54 will fail. However, if an approximate length of code is known, the barcode symbol area (a' b' c' d') can be artificially bounded. Step 50 may be performed on the last bar to confirm whether it is a valid barcode.

If the barcode candidate passes the check length procedure of step 56, a "bounding box" is determined, whereby the coordinates of the four corners of a barcode symbol are stored for later use. At this point, the system 10 must determine whether a two-width or a multi-width barcode has been located (step 57) since the subsequent decoding steps will be dependent upon the type (two-or multi-width) of barcode that has been detected. A multi-width barcode symbology is defined as any symbology having greater than two different width elements.

Figure 2H:
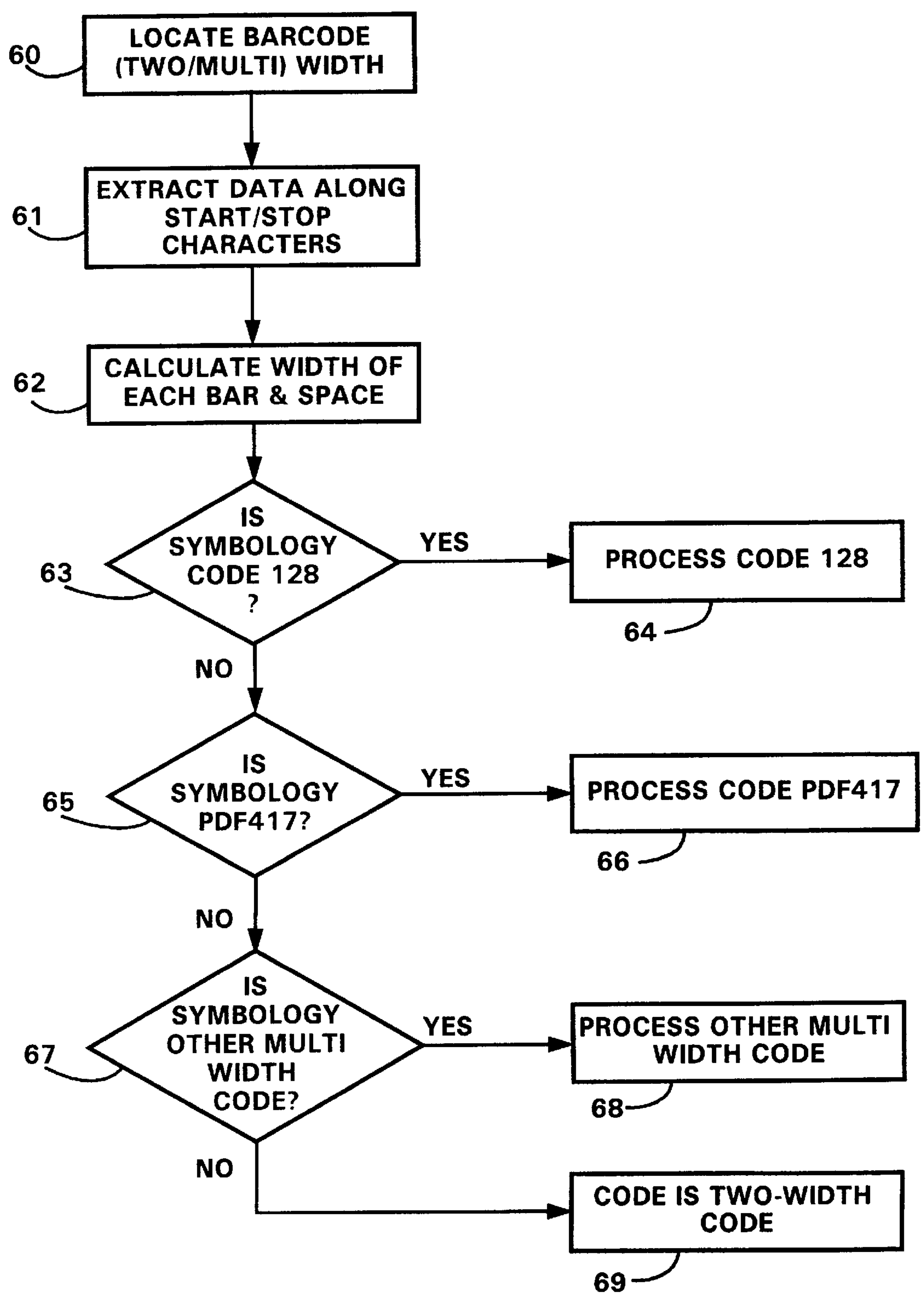
FIG. 2H is a flow diagram of the procedure for determining the difference between two-and multi-width barcode symbols.

Referring to FIG. 2H, the procedure for determining whether the code is a two-width or a multi-width code is shown. After the barcode has been located (step 60) the system 10 extracts data corresponding to the start/stop characters of the barcode symbol (step 61). This encompasses approximately forty pixels at the beginning and forty pixels at the end of the barcode symbol. The width of each bar and space is calculated (step 62) and the system 10 determines whether the symbology is Code 128 (step 63), PDF 417 (step 65) or some other type of multi-width symbology (step 67). If it has been determined that the barcode candidate is a multi-width symbology, it is processed in accordance with its respective symbology (steps 64, 66, 68). If the candidate fails all of the multi-width symbology tests, it is assumed that the detected barcode symbol is a two-width code.

Referring again to FIG. 2B, after the type of candidate has been determined (step 57) each candidate is decoded as will be explained in greater detail hereinafter. It will be appreciated by skilled artisans that several barcode labels are often located on a single object. To locate vertical barcodes in a ladder orientation the system 10 proceeds to perform a vertical grid line analysis (step 59) in the same manner as the horizontal grid line analysis was performed (step 43). The present invention will be able to simultaneously locate the coordinates of a plurality of barcode labels on an object.

Figure 7A:
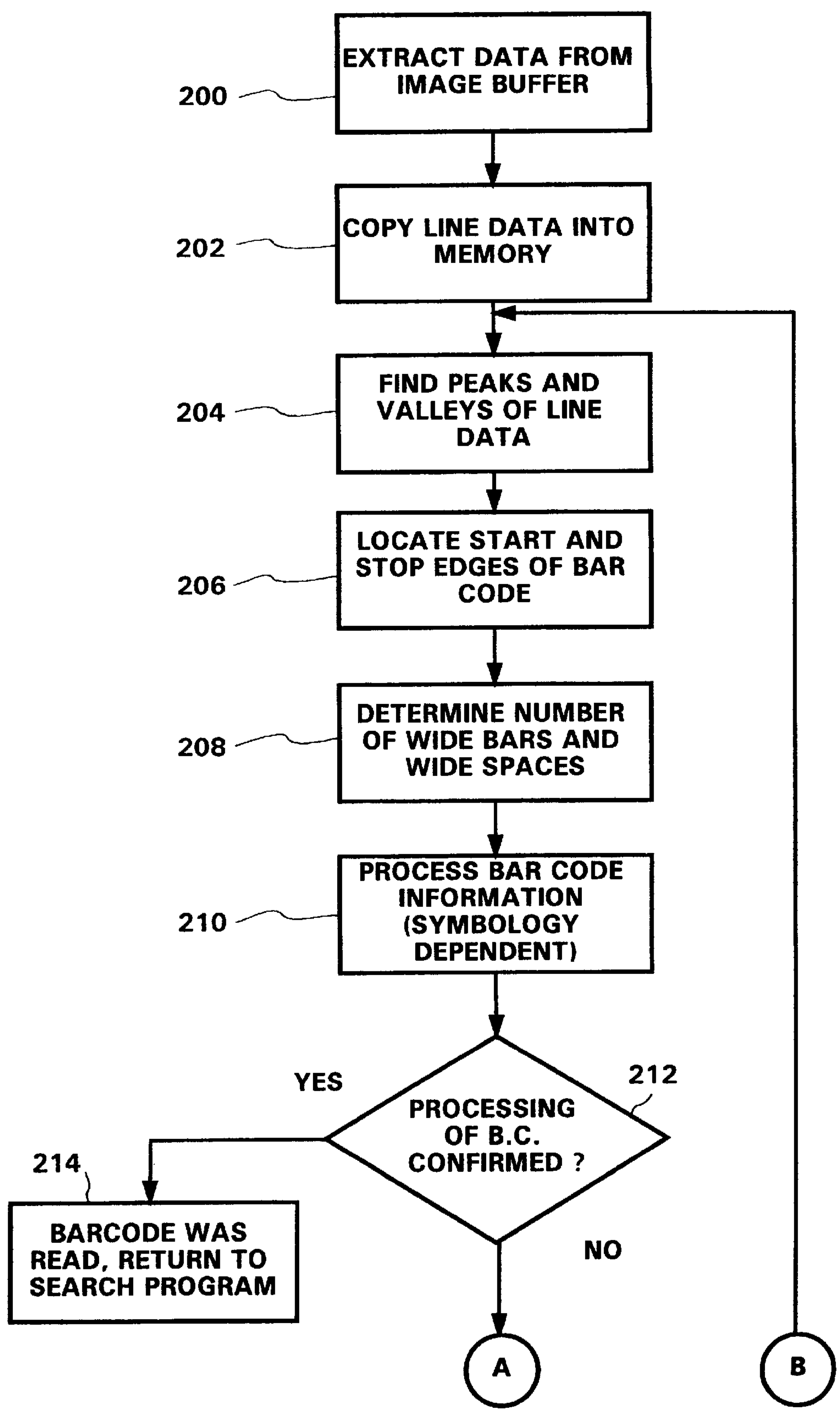
FIGS. 7A and 7B are flow diagrams of the preferred method of decoding a barcode symbol in accordance with the present invention.
Figure 7B:
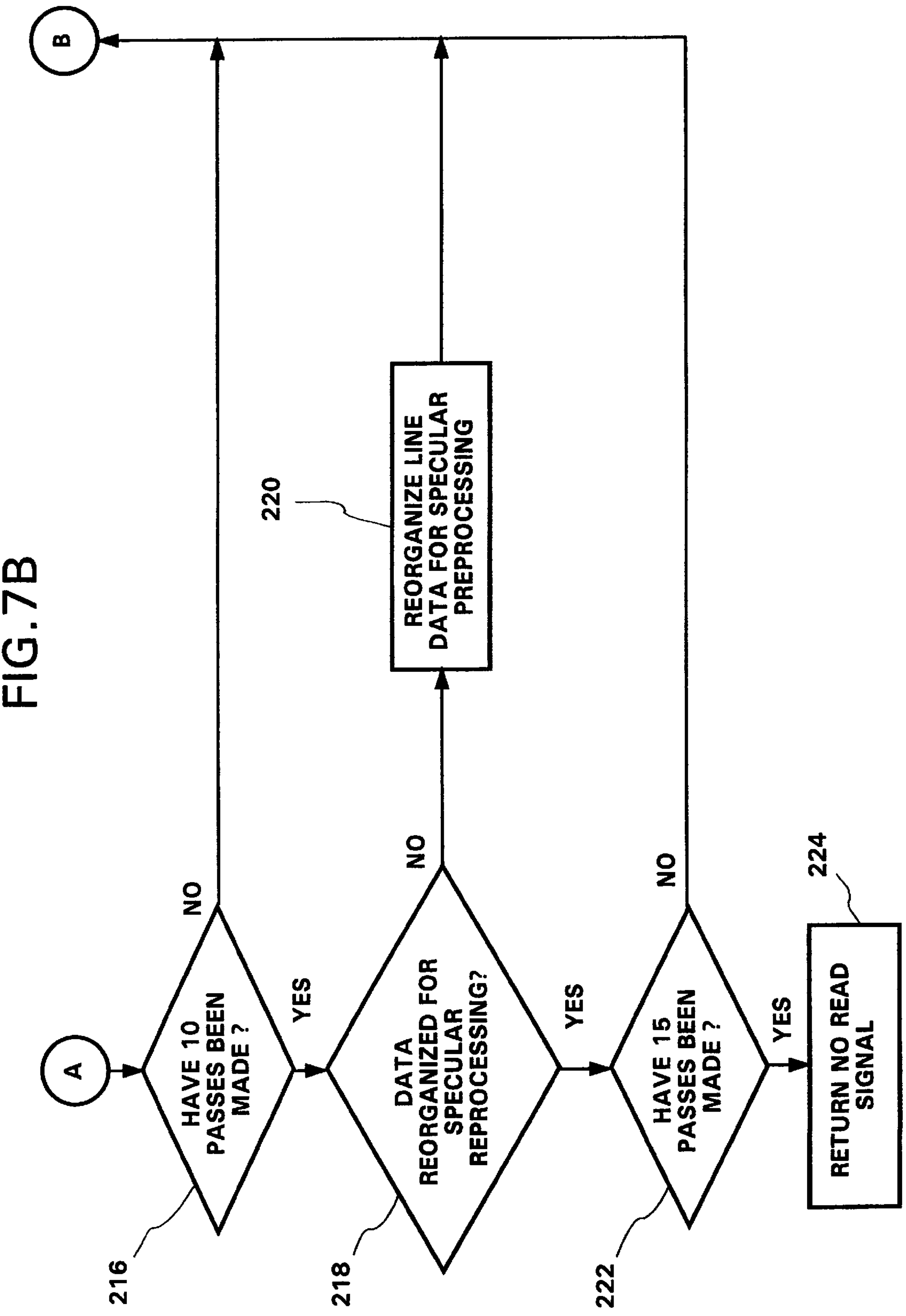

The preferred method of decoding a two-width barcode symbol in accordance with the present invention will be briefly explained with reference to FIGS. 7A and 7B and will subsequently be explained in detail. Referring to FIG. 7A, the system 10 extracts the coordinates of the barcode symbol and associated data from the image buffer (step 200). The image buffer includes location coordinates and gray scale data for the area of interest which approximates an electronic image of the barcode symbol in pixel format. The system 10 copies gray scale values for pixels of each scan line into a separate portion of memory for processing as needed (step 202). The peaks and valleys of the line data are found (step 204) and the exact start and stop location of the barcode symbol is determined (step 206). The number of wide bars and wide spaces are detected (step 208) in order to specify the type of barcode symbology which is being used in the detected barcode symbol. The barcode symbol information is then processed (step 210) in accordance with the type of symbology which has been determined in step 208. After processing of the barcode symbol has been confirmed (step 212), the system 10 outputs a signal that the barcode symbol was successfully read (step 214) and the system 10 returns to the barcode symbol location procedure.

If processing of the barcode symbol has not been confirmed (step 212), an analysis of up to ten scan lines (step 216) is repeated. If no confirmation of the barcode symbol is made after ten attempts (step 216), the data is sent to step 218. If the data has not been reorganized for specular processing (step 218), the data is reorganized (step 220), otherwise, the data passes to step 222 five more attempts to decode the barcode symbol are made. Once a total of fifteen attempts have been made to decode and confirm the barcode symbol without success (step 222), a "no read" signal is returned to the operator (step 224) and the barcode candidate is discarded. It should be recognized by those skilled in the art that the number of attempts could be a parameter set by the operator depending upon the application.

Figure 8:
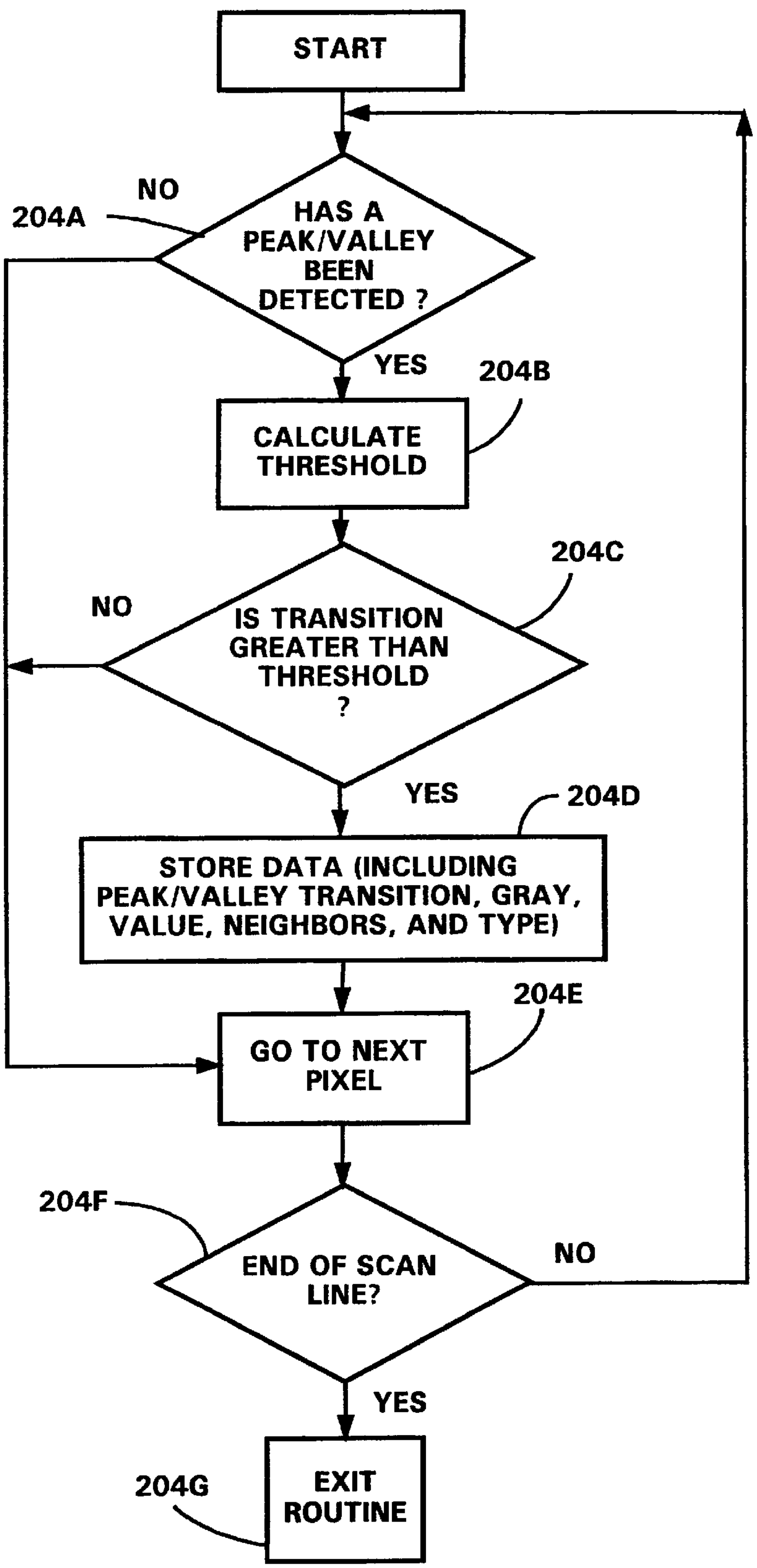
FIG. 8 is a flow diagram of procedure for finding the peaks and valleys of the scan line data.
Figure 9:
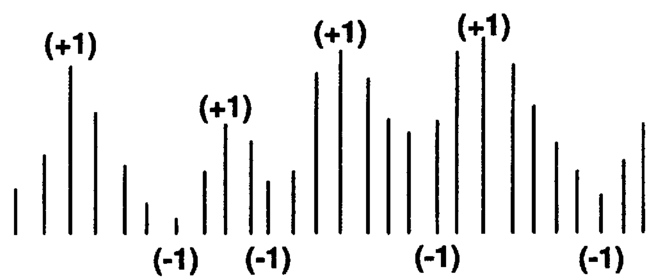
FIG. 9 illustrates peaks and valleys.

The method of decoding two-width barcode symbols shown in FIGS. 7A and 7B will now be described in greater detail. Referring to FIG. 8, the procedure for finding the peaks and valleys of the scan line data (step 204) is shown. Peaks and valleys are defined as portions of the barcode symbol data which have a first derivative of zero and thus no slope. Portions of the barcode symbol that have been determined to be peaks are given a positive (+) identifier and values that have been determined to be valleys are given a negative (−) identifier as shown in FIG. 9. The system 10 determines whether a point is a peak or a valley by calculating first and second derivatives. If a point has a first derivative equal to zero and a second derivative less than zero, the point is classified as a peak. If a point has a first derivative equal to zero and a second derivative greater than zero, the point is classified as a valley. Essentially, if neighboring pixels of pixel x have values less than pixel x, pixel x is a peak. If the neighboring pixels of pixel x have values greater than pixel x, pixel x is a valley.

Figure 10:
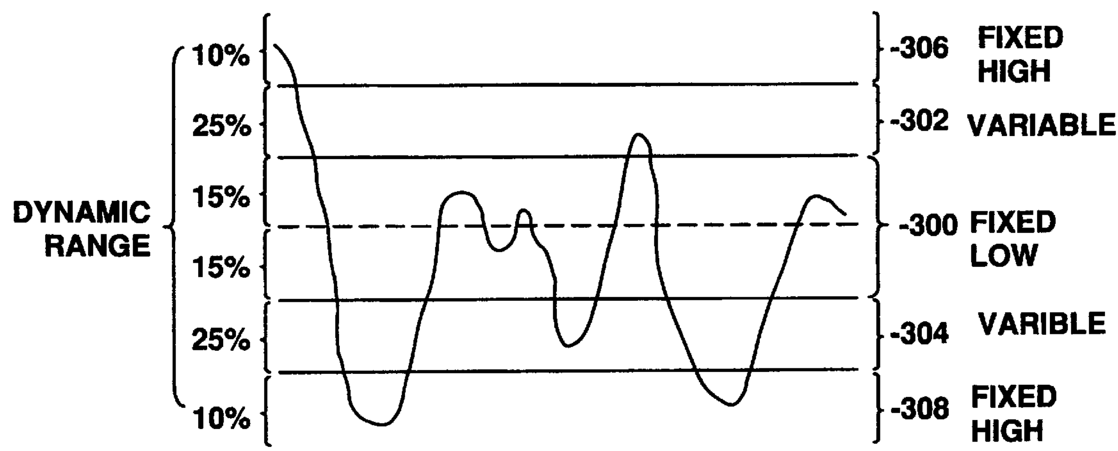
FIG. 10 is a diagram of the dynamic range of the data in a trigger line.

If peaks and valleys have been detected (step 204A), the system 10 then calculates threshold levels (step 204B) for comparison to the transition from one peak/valley to the next peak/valley. The thresholds are dependent upon the location of the transition within the dynamic range of the barcode symbol data. The dynamic range for an illustrative barcode symbol is shown in FIG. 10. The dynamic range is calculated at the beginning of each scan line and then segmented into five distinct regions. Near the middle of the dynamic range 300, the threshold is fixed at a "low" value. Located above and below the middle of the dynamic range are two regions of the dynamic range wherein a variable threshold 302, 304 is calculated. At the upper and lower limits of the dynamic range 306, 308, the threshold is fixed at a "high" value.

In the preferred embodiment, the system 10 has an 8 bit gray scale resolution resulting in 256 available gray scale levels (0–255). With 8 bit resolution, the threshold in the middle of the dynamic range 300 is fixed. For the portion of the dynamic range, when a variable threshold 302, 304 is calculated, a linear approximation is performed. Consider an example where the highest gray value for a peak is 250, the lowest given for a valley is 100, and the average pixel value is 180. The dynamic range is calculated as 250−100=150, and 15% of 150=22. Accordingly, for every peak and valley difference between (180−22) and (180+22), the threshold is fixed at a minimum threshold of 5. The threshold at the upper and lower limits of the dynamic range 306, 308 is fixed at 20 gray scale levels.

Noise is greater at higher and lower gray scale levels due to variations in printing and reflection characteristics of a label. Noise in the middle of the gray scale, typically caused by thermal (CCD noise), is significantly lower. Specular reflection and other variations greatly effect the barcode symbol data at the upper and lower limits of the dynamic range. These variable thresholds are effective in distinguishing a valid barcode symbol transition from noise and specular reflections.

Referring again to FIG. 8, if the transition value is greater than the calculated threshold (step 204C), the data is stored (step 204D) and the next pixel is analyzed (step 204E). If the transition value is smaller than the calculated threshold (step 204C), then the system 10 proceeds directly to the next pixel (step 204E). Once the end of the scan line data has been reached (step 204F) the routine is exited (step 204G).

Figure 11A:
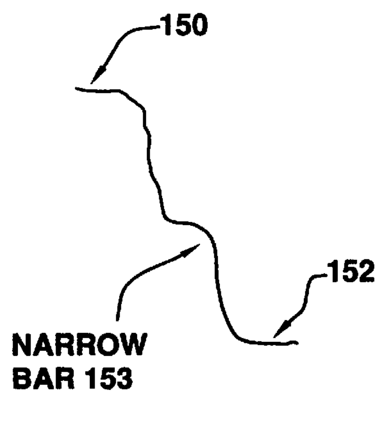
FIGS. 11A–11C are examples of the start of a barcode symbol.
Figure 11B:
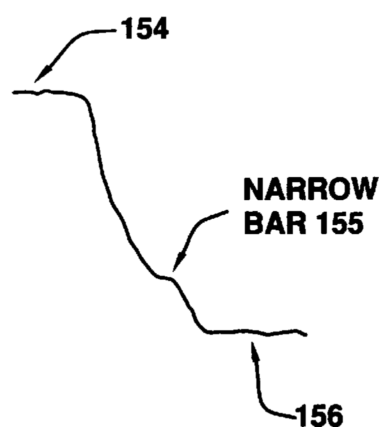
Figure 11C:
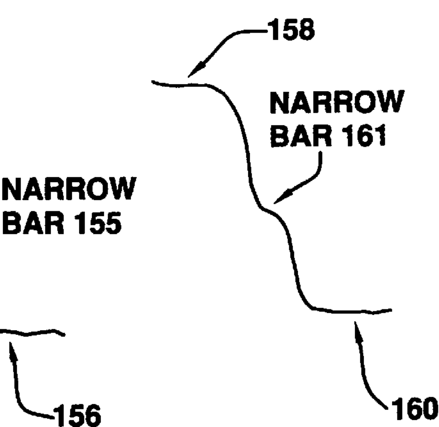

The location of the beginning and end of a barcode symbol is often difficult to ascertain since narrow bars and spaces may be marred or blurred. To accurately decode a two-width barcode symbol, the location of the beginning and end edges of the barcode symbol must be determined with accuracy. The method of locating the edges of the barcode symbol (step 206 shown in FIG. 7A) will now be described in detail with reference to FIGS. 11A–C. In order to minimize computational resources and to speed the locating of the beginning of the barcode symbol the system 10 searches for the first wide bar and the quiet zone. This provides a region of interest in which computational resources are focused on a detailed analysis. Typically, narrow bars and spaces will be present between the quiet zone and the first wide bar. The system 10 calculates the slope, or first derivative, for every two pixels between the quiet zone and the first wide bar. When the first derivative approaches zero, or a plateau is present, a narrow bar has been detected. This is shown in FIGS. 11A–C. Referring to FIG. 11A, a narrow bar 153 is clearly present between the quiet zone and the first wide bar 152. In FIGS. 11B and 1C, although a clear plateau is not detected, the slight slope indicates that a narrow bar 156, 161 is present.

Figure 13B:
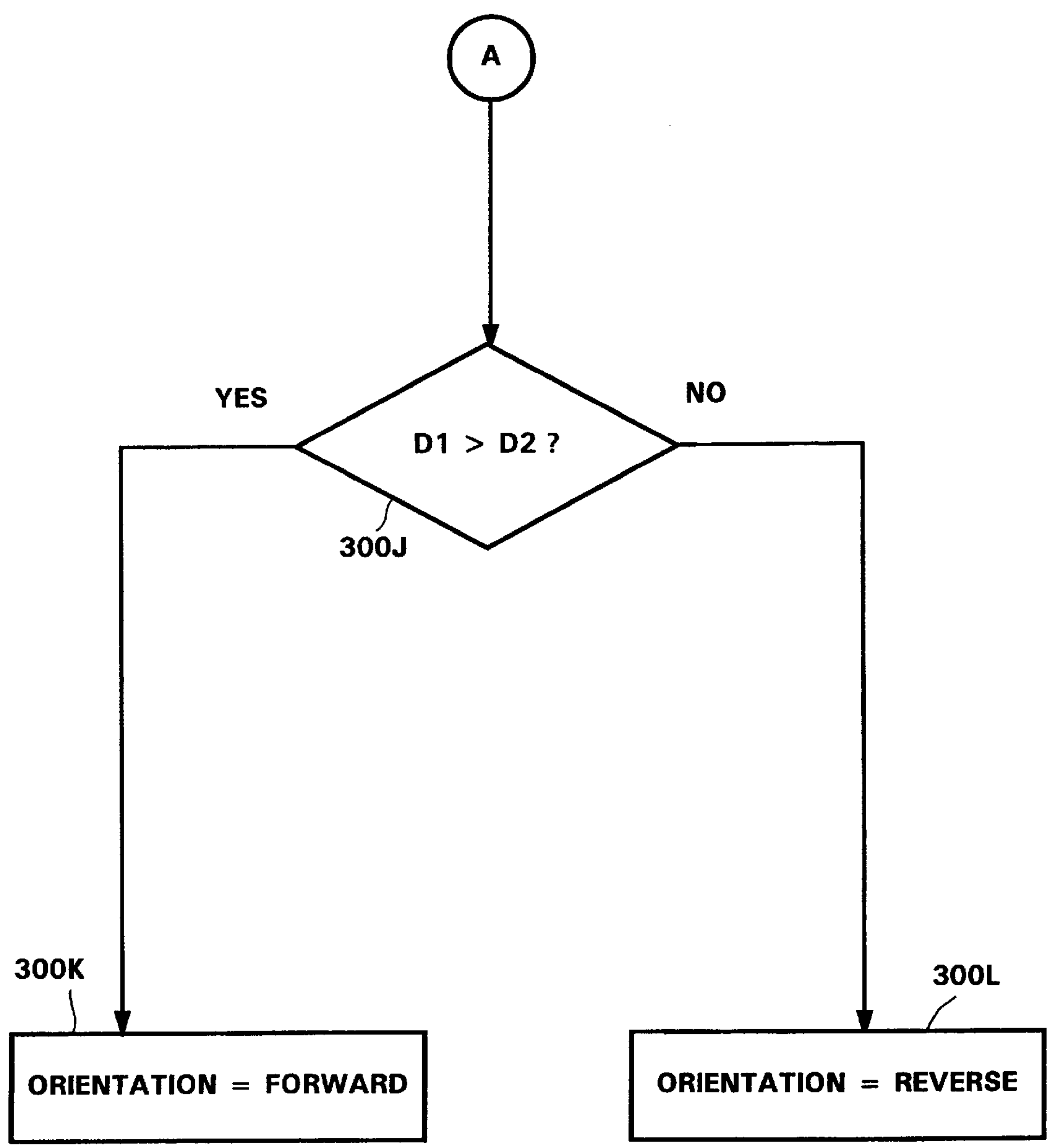

The determination of the number of wide bars and wide spaces (step 208 of FIG. 7A), will be explained in greater detail with reference to FIG. 12. First the system 10 tests for start/stop pattern for a Code 128 symbology (step 290) and PDF417 (step 292). If either one of these tests are successful, the barcode symbol is processed in accordance with that symbology (steps 294 or 296). Otherwise, the orientation of the barcode symbol (step 300) must be determined. This is shown in greater detail in FIG. 13. The system 10 first finds a reference wide bar/space and narrow bar/space (step 300A). A region of the scan line data which encompasses the first sixteen peaks and valleys is analyzed to determine the dynamic range and the highest and lowest values of the data. First, the highest value and lowest value are discarded and the second to the highest peak is marked as a reference wide space and the second to the lowest valley is marked as a reference wide bar. Next, the reference narrow bar and space are initially set to be equal to the average value of peaks and valleys.

The system 10 subsequently analyzes each peak and valley (step 300B) If the transition is a peak (or a space) the system 10 proceeds to step 300C to determine whether the peak is closer to a reference wide space or narrow space. If the peak is closer to a reference wide space, it is designated to be a wide space (step 300D) and the reference wide space is updated (step 300E) by averaging the reference wide space with the current wide space. This provides a weighted average of the wide spaces. The counter is then incremented at step 300H. If the peak is closer to a narrow space (step 300C) the counter is incremented (step 300H).

If a valley has been detected (step 300B) then the system 10 determines whether the valley (or bar) is closer to a reference wide bar or narrow bar (step 300M). If the valley is closer to the reference wide bar, the distance D1 from the wide bar to the end of the barcode symbol (step 300G) is measured. This procedure is repeated (step 300I) for the opposite end of the barcode symbol to obtain the distance from the first wide bar D2 to the end of the barcode symbol. Once both ends of the barcode symbol have been analyzed (step 300N) the system 10 determines whether the orientation is forward or backward (300J). In all widely used 2-width barcode-symbologies, the first wide bar is further from the beginning of the barcode symbol than the last wide bar is to the end of the barcode symbol. Accordingly, if D1 is greater than D2, the orientation of the barcode symbol is forward (step 300K), whereas if D2 is greater than D1 than the orientation of the barcode symbol is reverse (step 300L).

Figure 14:
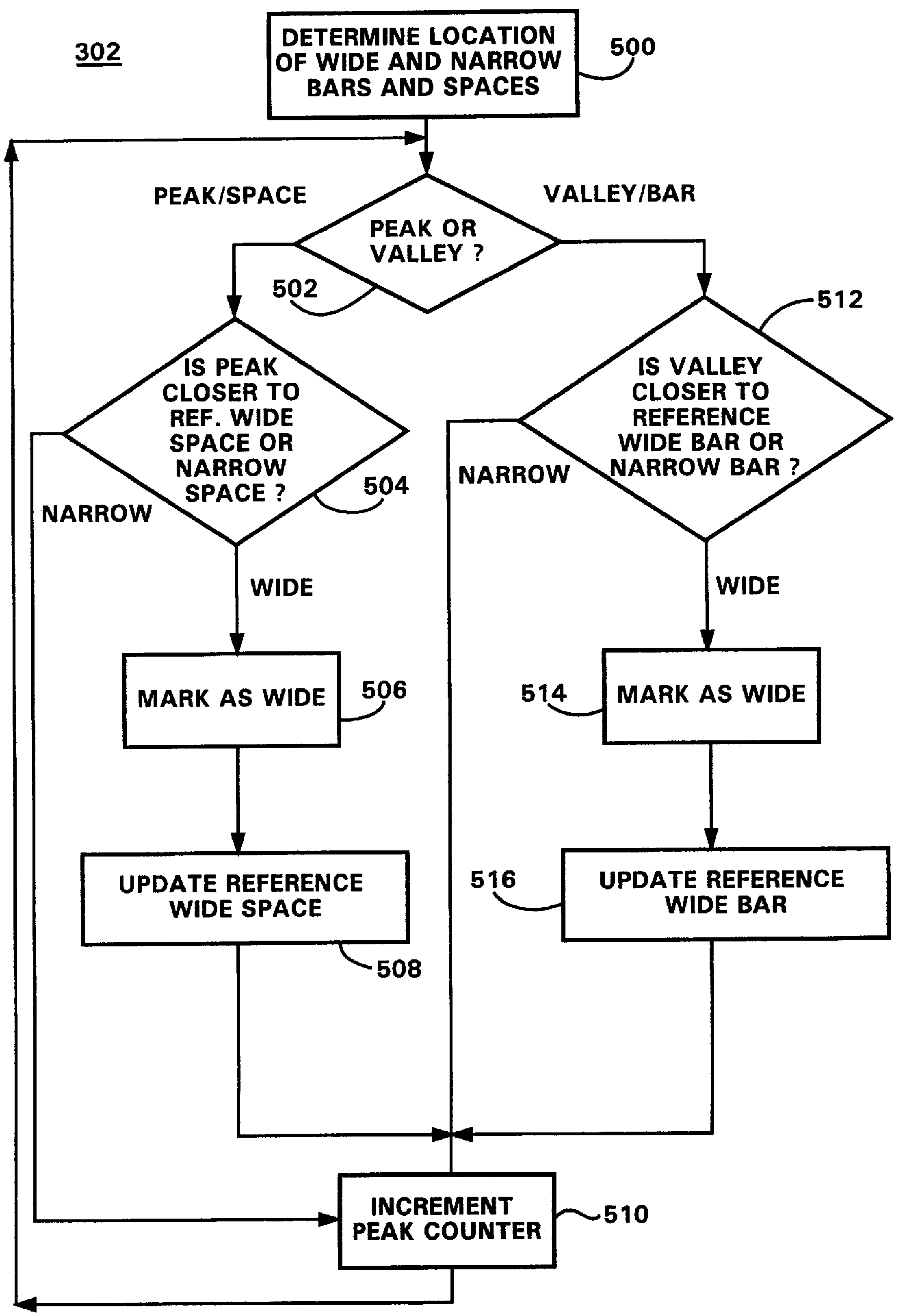
FIG. 14 is a flow diagram of the method for determining the number of wide bars and wide spaces in accordance with the present invention.

After the barcode symbol orientation has been determined (step 300), the system 10 determines the number of wide bars and wide spaces (step 302) using the process shown in FIG. 14. This procedure is similar to the procedure shown in FIG. 13, however, the system 10 analyzes every bar and space to determine whether the bar and space is narrow or wide.

Referring again to FIG. 12, once the barcode symbol orientation (step 300) and the number of wide bars and wide spaces (step 302) have been determined, the system 10 determines the type of barcode symbology being used. If the number of wide spaces is approximately equal to the number of wide bars (step 304) the barcode symbology is Interleaved 2 of 5 (step 306). If the number of wide spaces is approximately equal to one-half (½) the number of wide bars (step 308) the barcode symbology is Code 39 (step 310). If the number of wide spaces is approximately two times the number of wide bars (step 312), the barcode symbology is Codabar (step 314). If the barcode symbology has been determined to the I2 of 5, Code 39 or Codabar, the barcode symbol is then processed (step 318) in accordance with the symbology. If the barcode symbol which has been detected fails all of the tests (steps 304, 308 and 312), then the symbology is unknown (step 316). It will be appreciated by those skilled in the art that additional tests may be included to detect (step 315) and decode (step 317) other types of barcode symbologies.

Referring again to FIG. 7A, once the type of barcode symbology has been determined 208, the barcode symbol information is processed in accordance with the rules of construction for the type of symbology 210. This is shown in greater detail in FIGS. 15A and 15B.

Figure 15A:
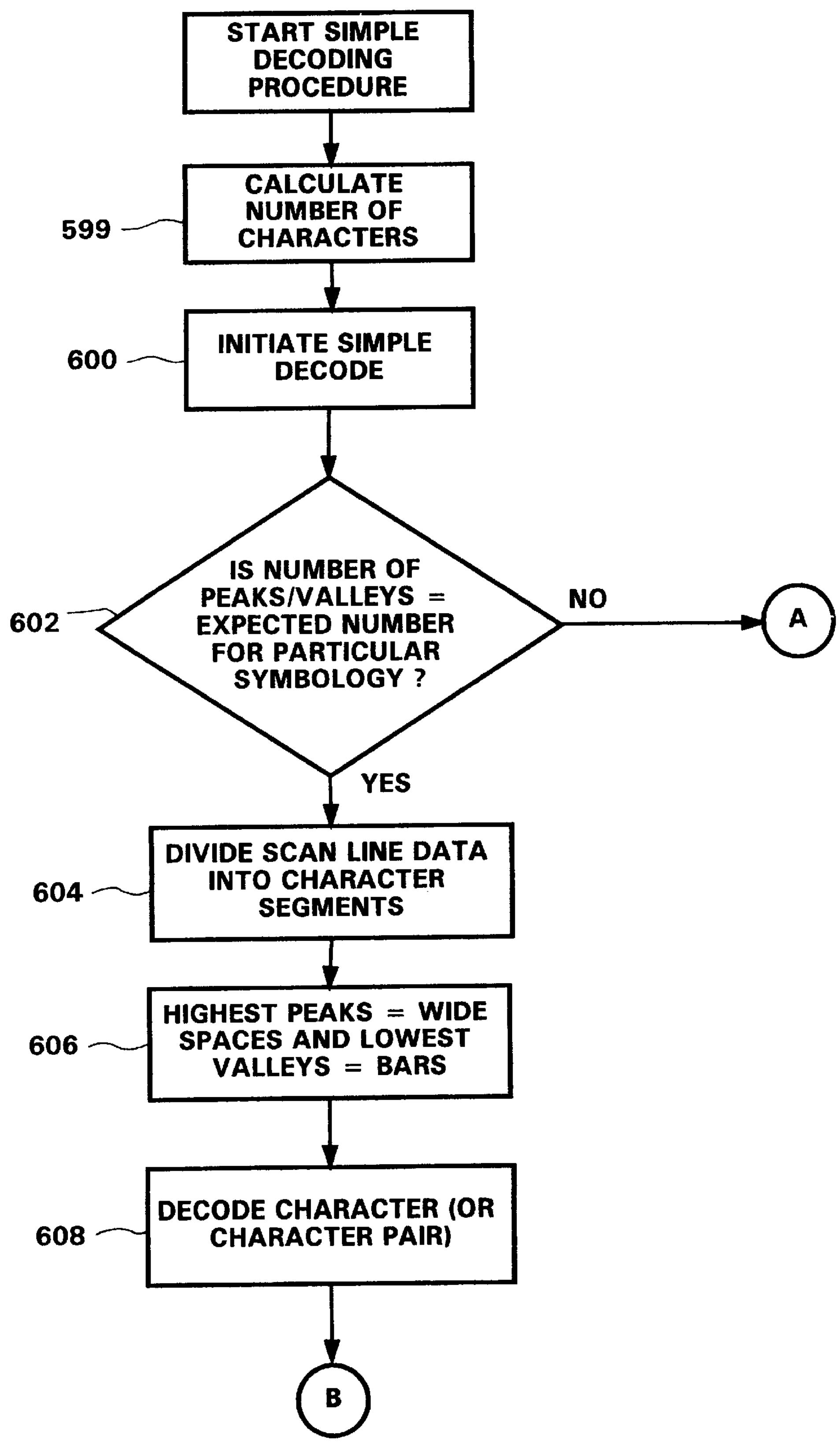
FIGS. 15A and 15B are flow diagrams of a method for processing barcode symbol information in accordance with the present invention.

Referring to FIG. 15A, a simple decode procedure is initiated (step 600). The system 10 determines whether the number of peaks and valleys in the line scan data is equal to the expected number of peaks and valleys for the particular symbology (step 602). The number of characters in the barcode symbol is determined by counting the number of wide bars and spaces as follows: If the code is code I2 of 5 then the number of characters is equal to the number of wide spaces or one less than the number of wide bars. For Code 39, the number of characters is equal to the number of wide spaces, or half the number of wide bars minus one (WB/2–1). For Codabar, the number of characters is equal to the number of wide bars. It should be appreciated that the number of Code 39 characters includes start and stop characters.

If the number of peaks and valleys is equal to the expected number of characters for the particular symbology, the scan line data is divided into segments (step 604). The highest peaks are designated as wide spaces and the lowest valleys are designated as wide bars with the remainder of the elements designated as narrow elements (step 606). Each character, or character pair, is then decoded (step 608) which completes processing of the barcode symbol (step 405).

Figure 15B:
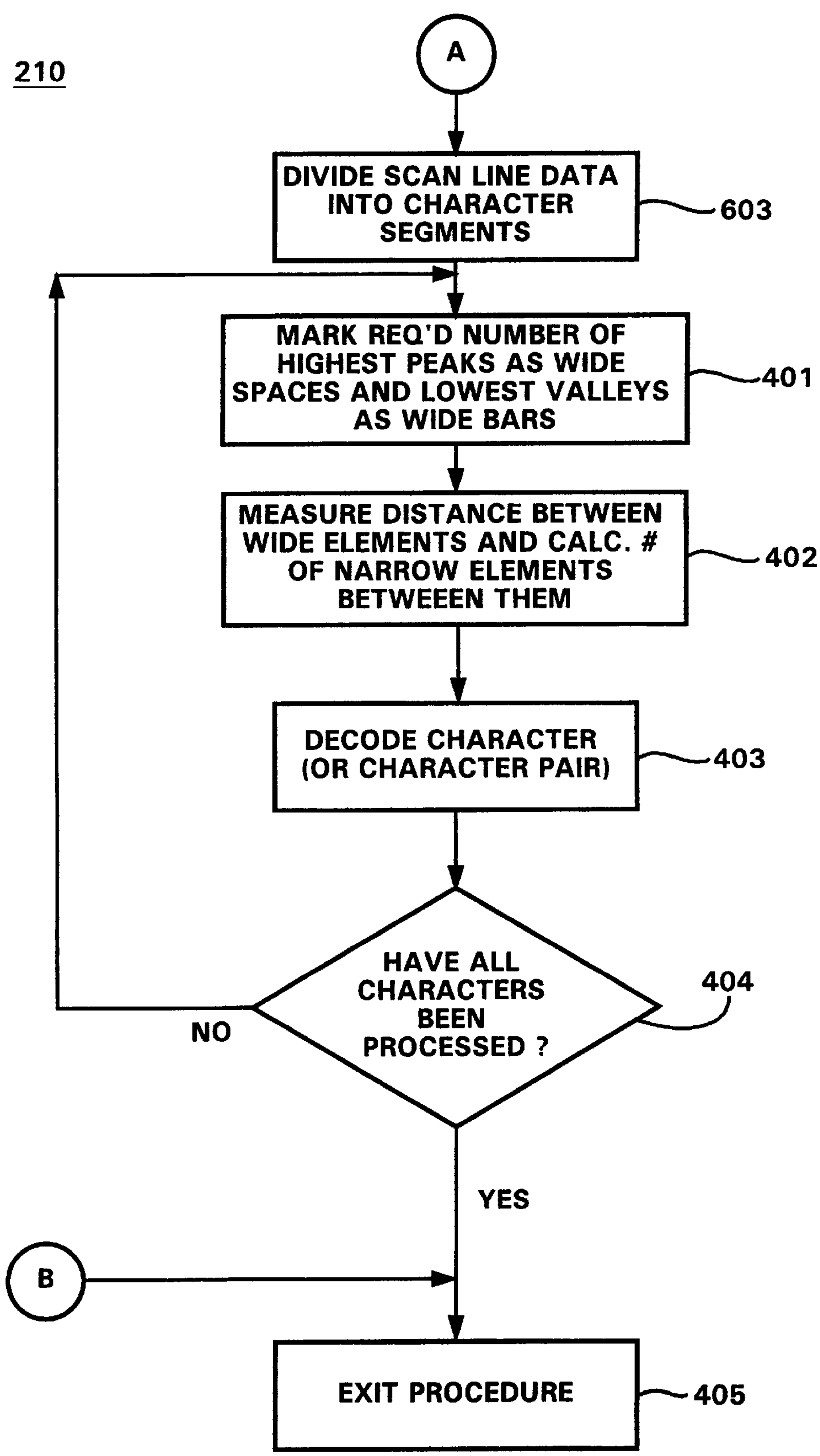

If it has been determined (step 602) that the number of peaks and valleys is not equal to the expected number of peaks and valleys for that particular symbology, (step 602) then a more detailed decoding procedure as shown in FIG. 15B is required. First, the entire scan line is divided into character segments and the highest peaks are designated as reference wide spaces and the lowest valleys are designated as reference wide bars (step 401). The system 10 then measures the distance between the wide elements and calculates the number of narrow elements that should be located between the wide elements (step 402). The measurement of the distance may be adjusted based on symbology characteristics. For example, at the boundary between two characters, it may initially be unclear whether a wide bar or space pertains to the first character or the second character. The present procedure permits a decoding attempt of the first character by using one or more of the wide elements located within the border region. If the attempt is unsuccessful, the wide elements may be associated with the second character in attempting a decoding of the second character. The system 10 then decodes the character, or character pair if the particular symbology requires decoding of pairs (step 403). Once all of the characters have been processed (step 404) the barcode symbol has been decoded.

The processing of the barcode symbol must then be confirmed (step 212) as shown in FIG. 7A. In the preferred embodiment of the present invention, the confirmation of the processing of the barcode symbol (step 212) comprises comparing the decoding of a subsequent scan line with an earlier scan line to determine if they are the same. As is well known to those skilled in the art, the confirmation threshold may be set as desired by the operator for "two out of three" or "three out of four" scan lines that match. If the barcode symbol has not been confirmed after ten passes (step 216) the data is reorganized for specular preprocessing (step 220). This process (step 220) will be described hereinafter with reference to FIGS. 16A–16C. Step 220 may be either a primary or a secondary operation. For example, if specular reflection is anticipated on packages to be scanned, the system 10 may proceed directly to step 220 after enough scans have been acquired.

Figure 16A:
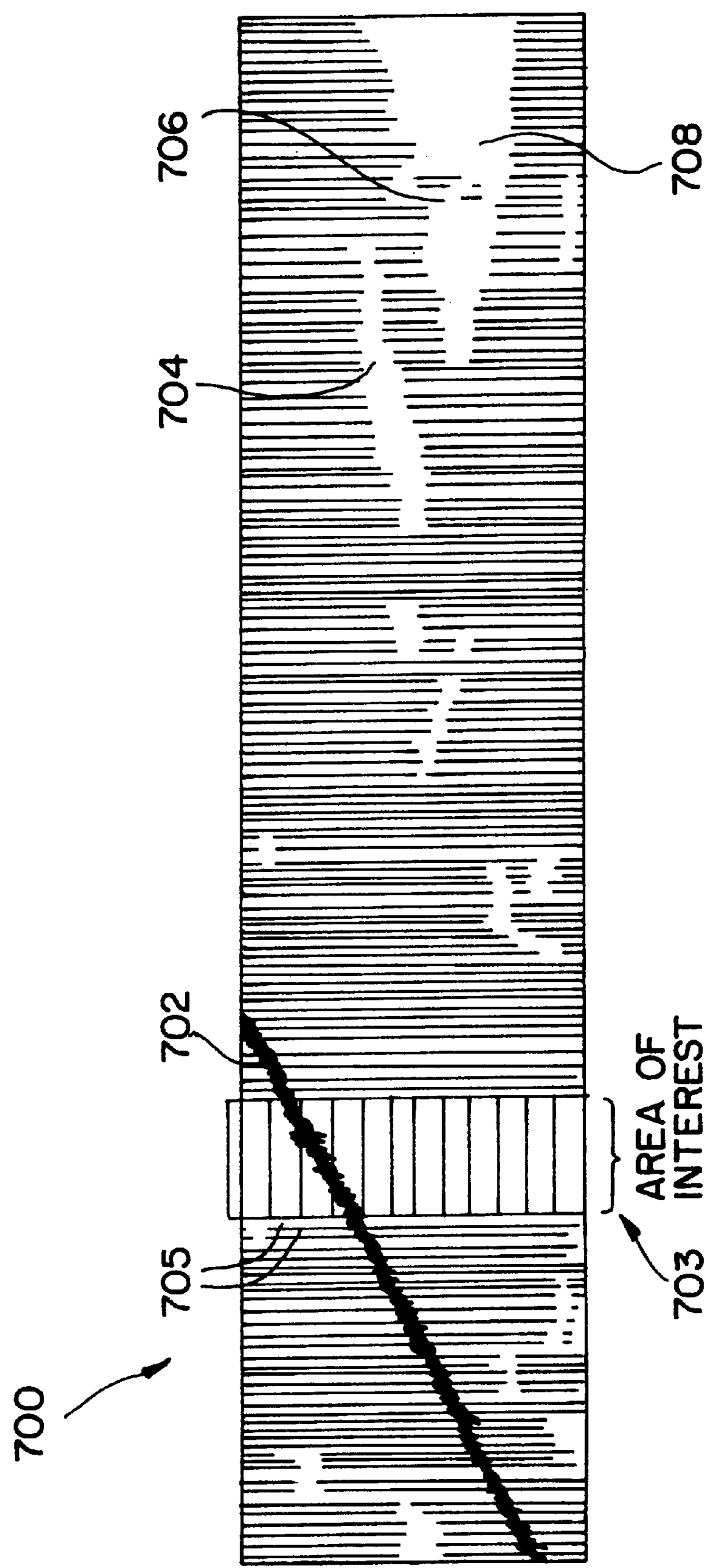
FIG. 16A is a gray scale image of barcode symbol having a plurality of unreadable regions.

Referring to FIG. 16A, a gray scale image of a barcode symbol 700 having a plurality of unreadable regions 702, 704, 706, 708 is shown. With this gray scale image of the barcode symbol 700, the system 10 will be unable to obtain a completely readable confirm scan line due to the unreadable regions 702, 704, 706, 708. The regions 702, 704, 706, 708 may be caused by specular reflections 704, 706, 708 that wash out the CCD detector 20 or may be contaminants or markings 702 located on the barcode symbol 700. A region of interest 703, showing a plurality of scan lines 705 will be discussed hereinafter.

Figure 16B:
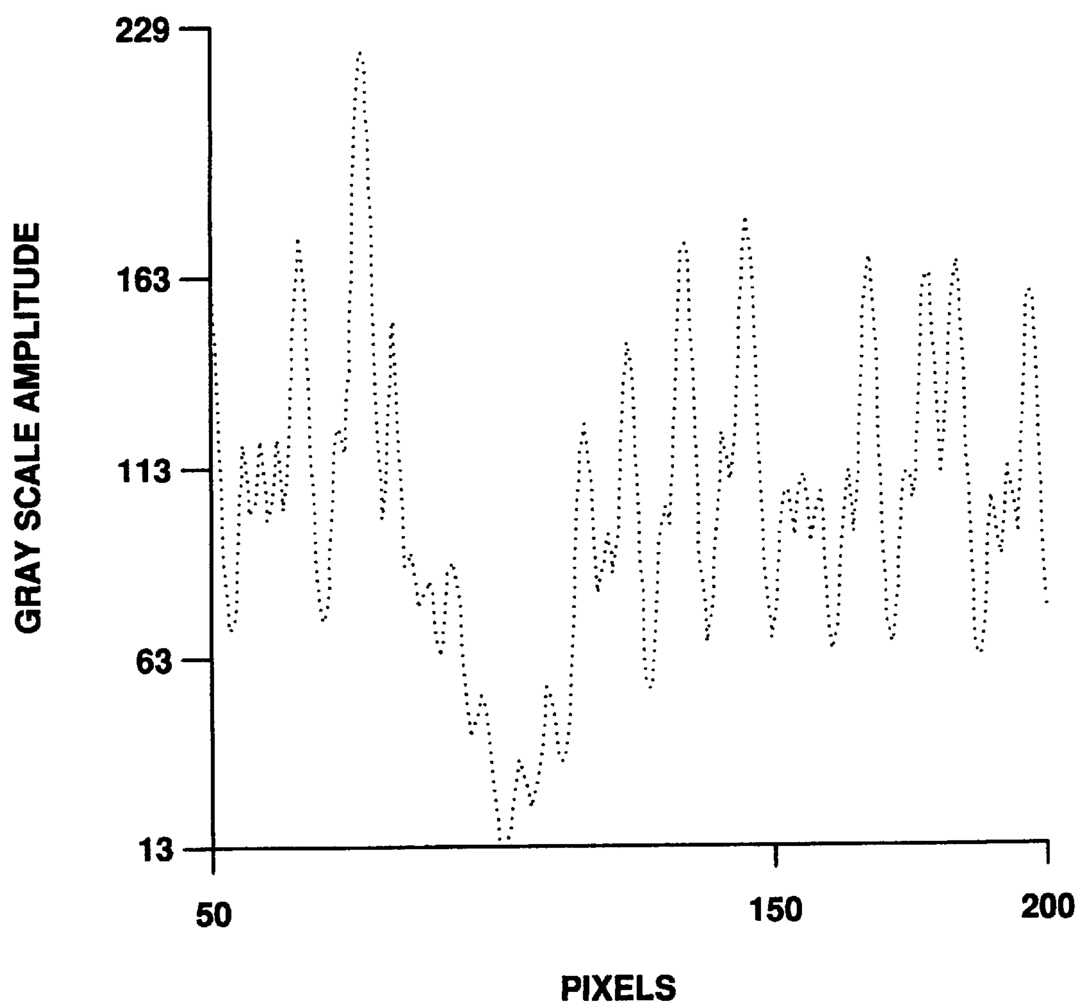
FIG. 16B is a plot of the gray scale amplitude from a selected scan line before sorting.

Referring to FIG. 16B, a plot of the gray scale amplitude for scan line number 705 in the area of interest 703 is shown. The specular reflection and dark markings upon the barcode symbol 700 create large differences in the gray scale values of the pixels along the scan line. As shown in FIG. 16F, specular reflection causes the gray scale values of selective pixels to be extremely high. Likewise, black marks upon the barcode symbol 700 cause the gray scale values to be extremely low. This may lead to errors in decoding the barcode symbol 700.

In the preferred embodiment, the data is reorganized so that the decoding of the barcode symbol 700 may be performed. The pixels in each column are sorted such that the largest value in each column appears in the top row and the smallest value appears in the bottom row. Using this technique, the portions of the image due to specular reflection float to the top and the portions of the image due to dark markings sink to the bottom. Thus, the center rows contain data which is most likely to be correctly representative of a complete barcode symbol. Sorting of the data acts as a low-pass filter on the image due to the low resolution of the CCD pixel grid utilized to acquire the image and slight alignment irregularities.

Figure 16C:
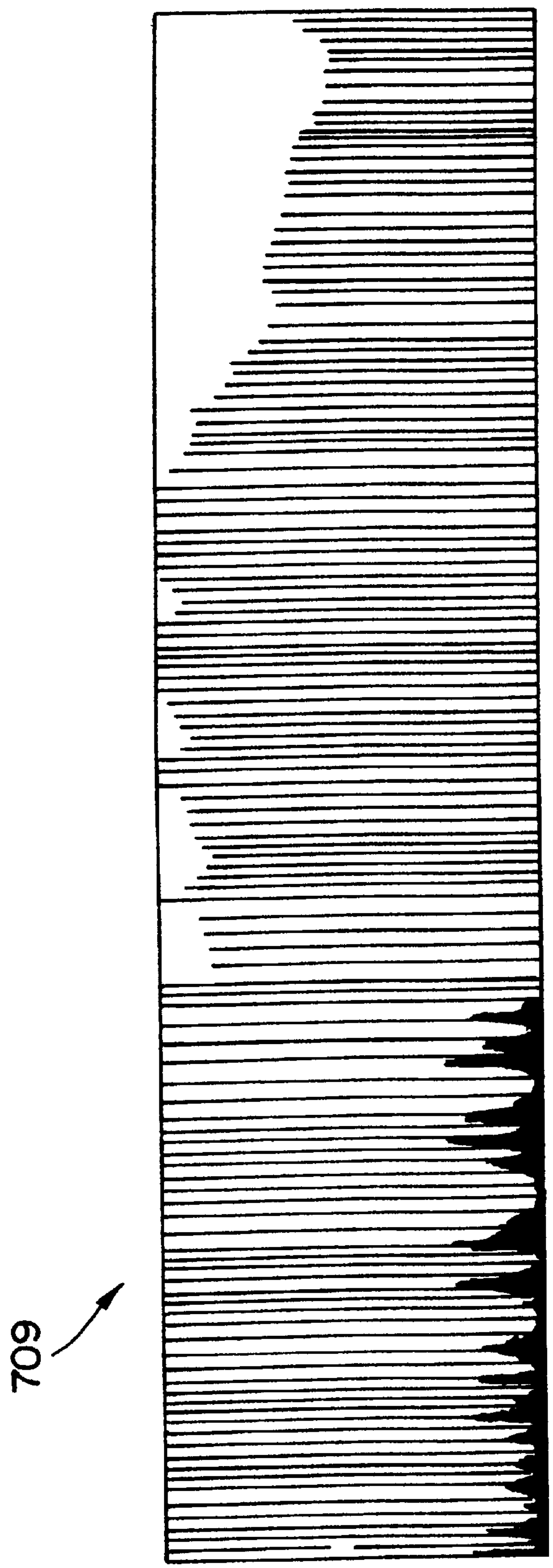
FIG. 16C is the gray scale image of FIG. 16A after sorting.
Figure 16D:
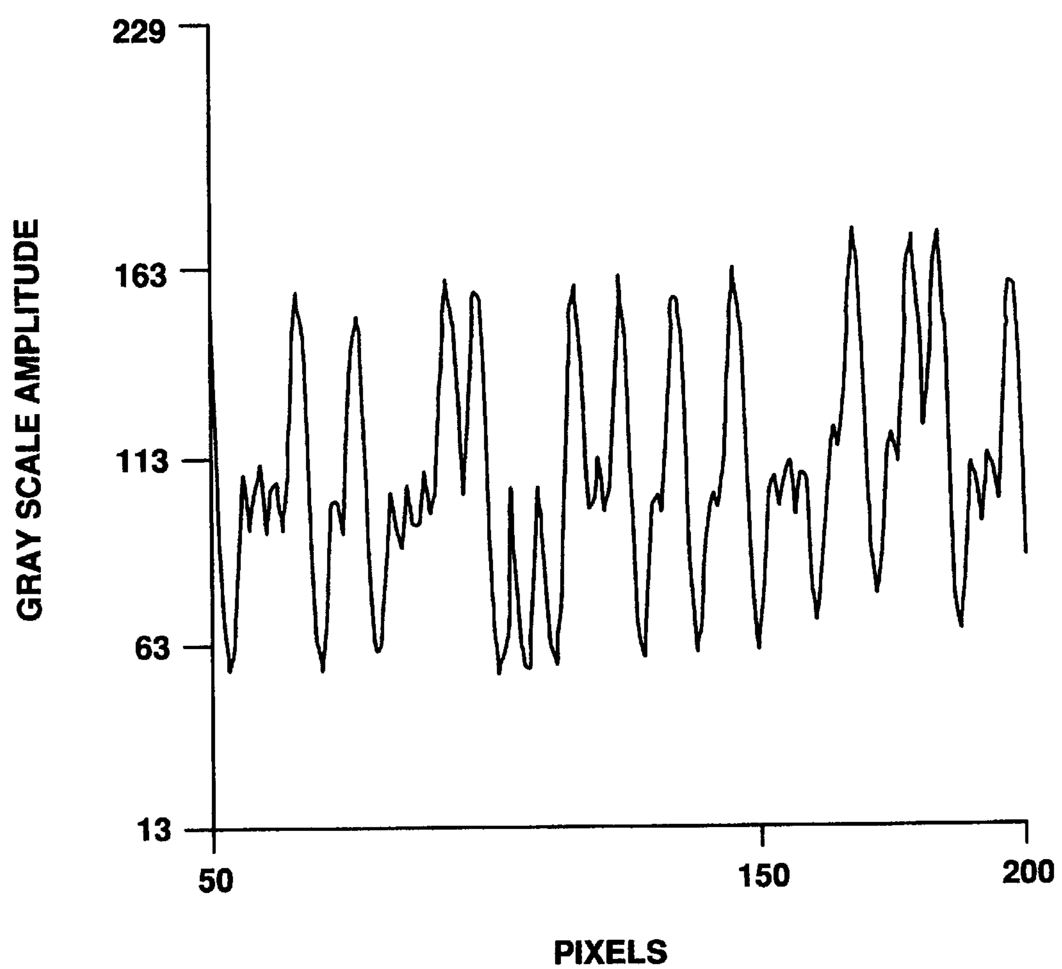
FIG. 16D is a plot of the gray scale amplitude from the scan line of FIG. 16B after sorting.

A gray scale image 709 which has been sorted in accordance with the present invention is shown in FIG. 16C. It can clearly be seen that the higher (and thus brighter) gray scale values are located at the top of the gray scale image and the lower (and thus darker) values are located at the bottom of the image 709. The middle portion of the image 709 contains accurate information which is representative of the barcode symbol. The gray scale values associated with the sorted image 709 are shown in FIG. 16G. Referring to FIG. 16D, a plot along scan line 5 after sorting of the data associated with each pixel is shown. The sorting process normalizes the data by eliminating the excessive peaks and valleys which are most likely not representative of the actual barcode symbol.

Figure 16E:
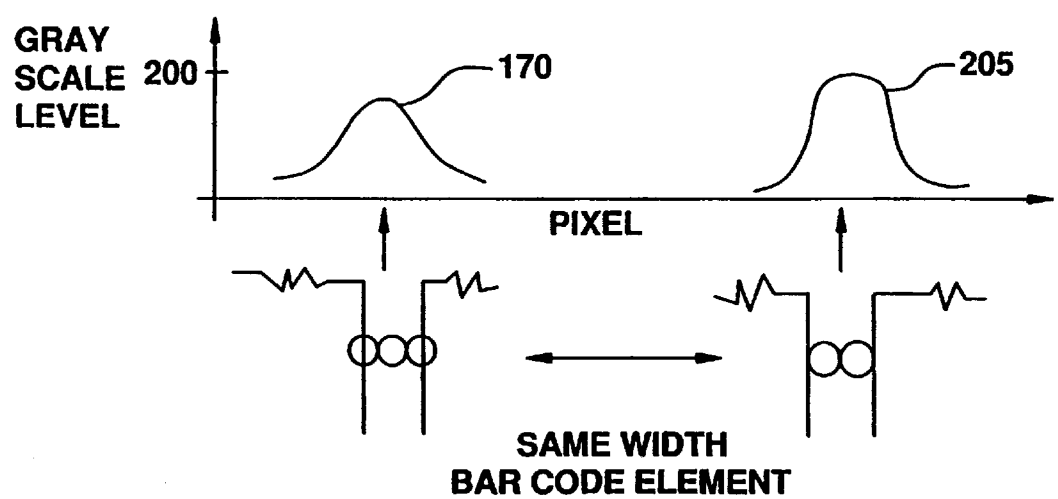
FIG. 16E shows aliasing which occurs due to pixel misalignment.

Sorting of the pixels also removes the effects of pixel aliasing. As is well known by those of skill in the art the gray scale value is a function of the pixel alignment on the barcode image. Aliasing occurs when the CCD pixels are misaligned with respect to the bars and spaces. For example, as shown in FIG. 16E, if the pixels are misaligned with the space, a lower amplitude pulse will be obtained. However, if the pixels are correctly aligned a higher, squarer pulse output will be obtained. Sorting the pixel values normalizes the inconsistencies such that similar width elements in a scan line have similar gray values. Once the effects of aliasing are removed, subsequent gray scale composition analysis can be performed on any multi-width element codes to determine the encoded information. Gray scale composition analysis will be described in detail hereinafter with reference to FIG. 19 (step 914).

Figure 17A:
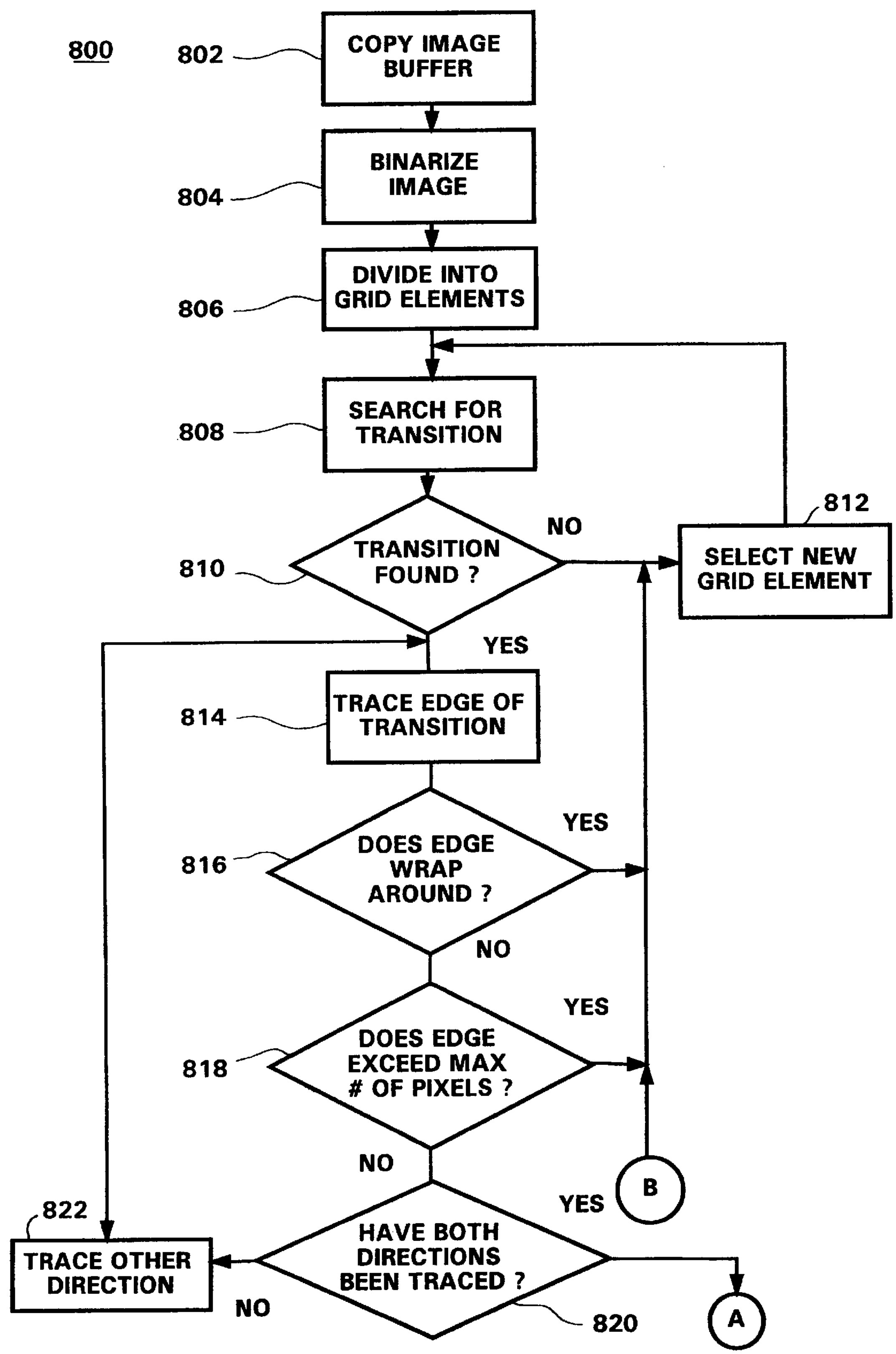
FIG. 17A and FIG. 17B are flow diagrams of an alternative method for locating barcode symbols in accordance with the present. invention.
Figure 17B:
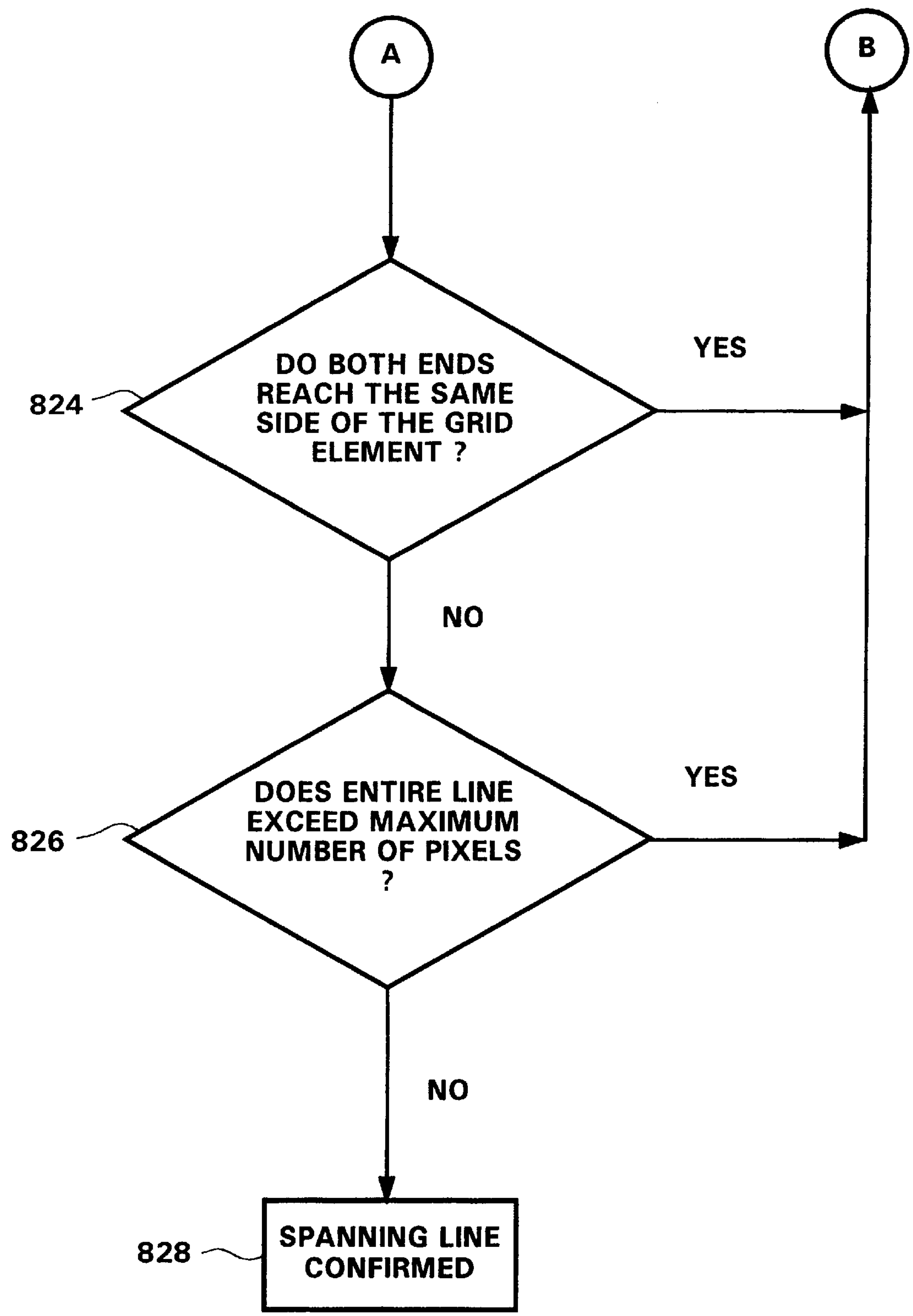

Referring to FIGS. 17A and 17B, an alternate method (step 800) for locating barcode symbols in accordance with the present invention is shown. First, the image buffer is copied into memory for analysis (step 802). The image is binarized (step 804) whereby pixels having a gray scale value greater than the threshold limit are designated as white and those having a gray scale value less than the threshold are designated as black. The image is divided into a grid (step 806) wherein horizontal and vertical lines are placed throughout the image. Preferably, the grid lines are evenly spaced in both directions (e.g., every 32 pixels in the horizontal and vertical directions), but it is not essential that blocks are square.

The system 10 searches for a transition near the center of each grid element (step 808). The objective is to locate the longest spanning line in the block to eliminate noise caused by contaminants and other extraneous marks on the barcode symbol. First, the block is divided by placing "cross hairs" on the center of the block. Starting from the center of the cross hairs and moving outward, the system 10 searches for the first transition (black-to-white or white-to-black) within the block. If no transitions are found (step 810) in either of the horizontal or vertical direction, the block is considered to contain no spanning line. For faster processing, the system 10 may only consider transitions near the center of the cross hairs. If no transition is found, a new grid block is selected (step 812) and the search for a transition (step 808) begins again.

If a transition is found (step 810) the edge of the transition must be traced. When tracing the edge of a transition (step 814) two things may take place: 1) the edge will eventually reach the edge of the grid block; or 2) the edge will wrap around on itself to the same point as the starting point. If the edge does wrap around (step 816) that the grid block is considered to have no spanning lines and a new grid block is examined (step 812).

The system 10 must then determine if the edge exceeds the maximum number of pixels along a straight line between the initial transition and the furthest grid element edge. If the maximum number of pixels has been exceeded before reaching the edge of a block (step 818), the search can be terminated since the transition edge can not lead to a spanning line. Using the maximum pixel count will eliminate wandering transition edges that eventually reach the edge of a block, for example, a spiral.

If the transition edge reaches a block edge, the system 10 returns to the initial transition and traces the edge in the opposite direction (step 822). If a trace of the opposite direction fails to reach the block edge within the maximum number of pixels, the block is considered to contain no spanning line. When the system 10 has traced the line in both directions with success (step 820), a series of tests is performed to confirm that the line is a true spanning line. First, the system 10 determines whether both ends of the spanning line reach the same side of the block (step 824). If so, the spanning line is invalid. Next, the system 10 determines whether the entire spanning line exceeds the maximum number of pixels (step 826). If not, the spanning line has been confirmed as a valid spanning line (step 828).

Once a valid spanning line has been determined for a particular block, the same procedure is performed for all blocks. The orientation of each spanning line may be determined by using the slope formed by the end points of each traced edge. The orientation of a line is the angle of that particular line.

The oriented blocks must then be clustered into barcode candidates. In a typical situation, most of the blocks will have no spanning lines. The blocks with no spanning lines will have no orientation. The blocks from a valid barcode candidate should have the same spanning line orientation within a certain tolerance level. In simple cases, a standard color blob analysis algorithm is performed. In a color blob analysis, each orientation of a line is assigned a particular color. All squares with similar colors are grouped together form one blob.

Figure 18A:
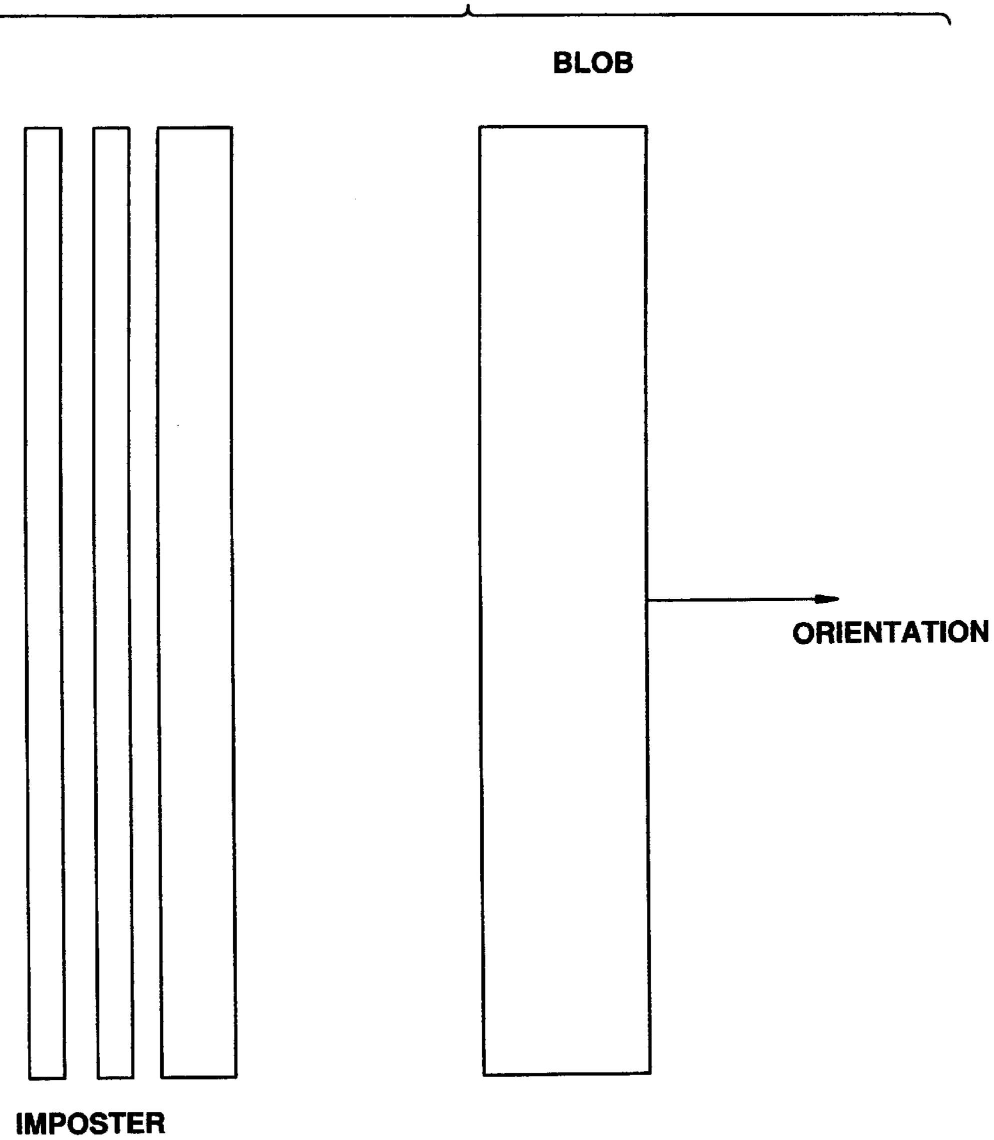
FIG. 18A is an imposter after color blob analysis.
Figure 18B:
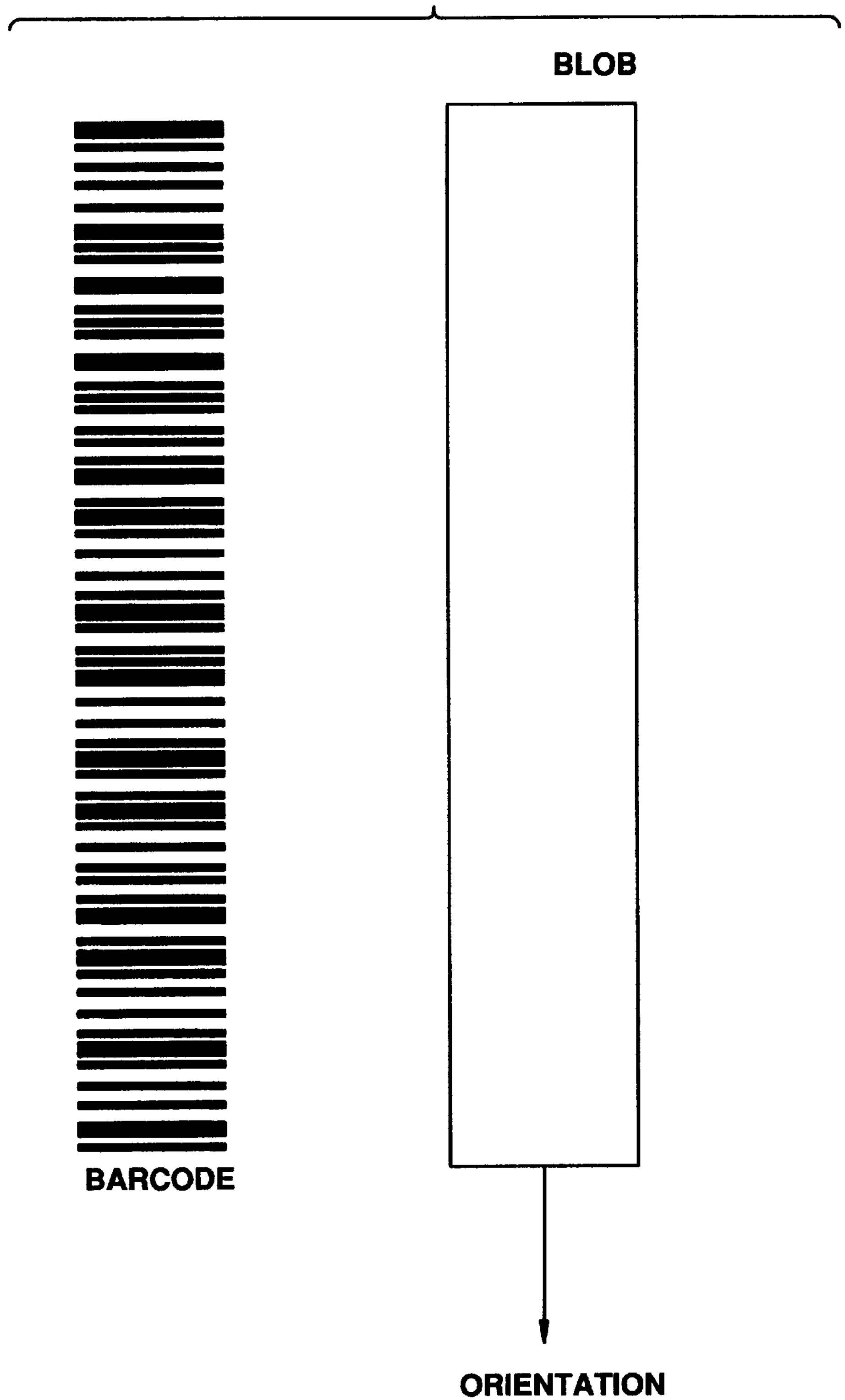
FIG. 18B is a valid barcode symbol after color analysis.

Thus, all squares in a blob will have a similar angle orientation. Certain geometric patterns will have blobs with similarly oriented grid elements. As shown in FIG. 18A, if an imposter pattern has a number of long lines, it may produce a long skinny blob that appears to be a valid barcode symbol. However, the imposter blob will have its orientation parallel to its length. Referring to FIG. 18B, while a barcode symbol produces a similar blob, the color will be different since its orientation is parallel to its width. Using this procedure, final candidates may be filtered or preliminary candidates may be prescreened.

The preferred method of decoding a multi-width barcode is shown in FIG. 19. Referring to step 900, the system 10 analyzes the start and stop pattern of the multi-width barcode symbol to determine what type of symbology is present. As is well known to those skilled in the art, Code 128, UPC and EAN comprise bars and spaces having 4 different widths, (1, 2, 3 and 4 elements wide). Some codes have even more, such as PDF417 with 6 widths.

Figure 20:
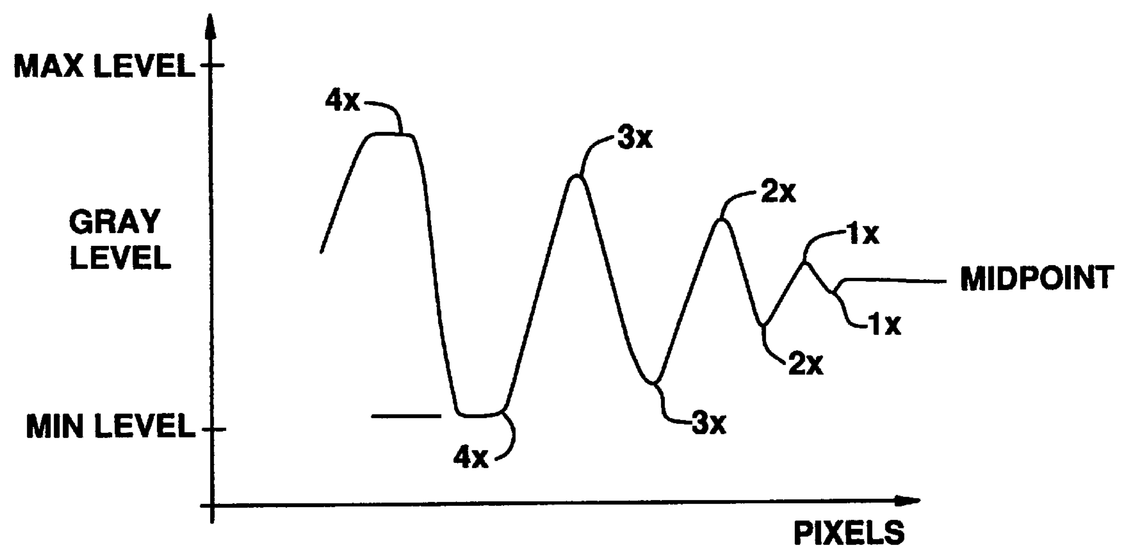
FIG. 20 is a plot of the gray scale amplitude from a multi-width barcode symbol.

Gray scale amplitude levels are selected for each the different widths of the bar and space elements after the effects of pixel aliasing have been removed. The gray scale level may be calculated by analyzing the start and stop patterns, or may be determined by ranking the gray scale amplitudes located within the area of interest, in terms of width; wherein the highest plateau having the longest duration corresponds to the widest spaces and the lowest plateau having the longest duration corresponds to the widest bars. When the gray scale levels reach a plateau, for example the 4X elements in FIG. 20, that element width is considered to be resolved. Gray scale composition analysis examines the remainder of the unresolved element widths. These element widths will proportionally fall between the widest elements (4X) as shown in FIG. 20.

The system 10 subsequently extracts data along a trigger line within the barcode symbol (step 904) and numerically sorts the data corresponding to each pixel (step 906) to filter out specular reflections and damaged or otherwise unreadable portions of the barcode symbol. Even in the absence of specular or damaged barcode symbols, sorting of data corresponding to each pixel is required to normalize the amplitudes of the peaks and valleys. The sorting procedure was previously described with reference to FIGS. 16A–16C.

Figure 21:
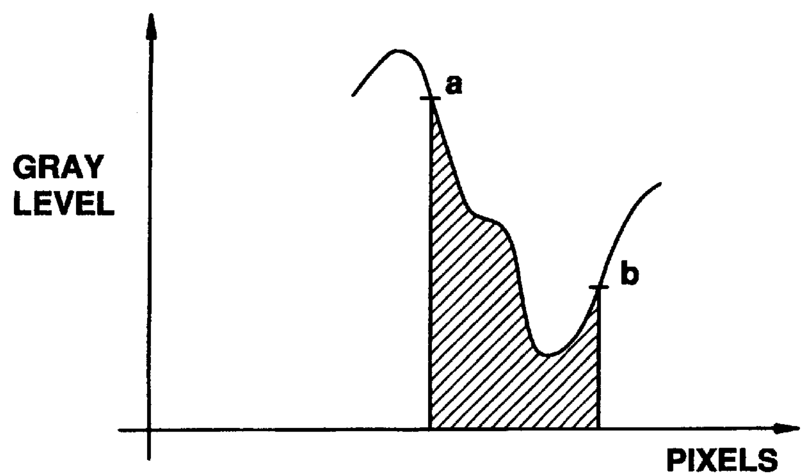
FIG. 21 shows gray scale composition in accordance with the present invention.

After a data set has been determined, the system 10 calculates the run length (step 908) which is basically the width of a bar or space. Referring to FIG. 21, the width is determined by calculating the area under a selected portion of the gray scale waveform corresponding to the bar or space using the following equation:

$$\text{runlength/width} = \frac{\sum_{pixel=a}^{b} \text{Gray scale Amplitudes}}{\text{Min area}} \tag{6}$$

Min-area is the area of the narrowest element in the start/stop pattern. Although a Code 128 barcode is used in the present example, it should be understood that this procedure is equally applicable to any multi-width symbology. For Code 128, each character has three bars and three spaces and the width of each character is the same for all characters. Accordingly, the width of the character is evaluated (step 910) to determine whether the sum of the widths of six elements does not exceed the predetermined value for the width of a Code 128 character.

The system 10 determines whether the character is decodable based solely upon analysis of the run length data (step 912). If the character is decodable, the character is decoded (step 916). If the character is not decodable, the widths of the unresolved elements are resolved using gray scale composition analysis (step 914). For example, consider the situation where a 2 width bar is preceded by a one width space and a one width bar which have merged together. This provides an element of width 4. When the gray scale value of that 4 width element is analyzed, it becomes apparent that the gray scale value is closer to a 2 width bar than to a 4 width bar. In this manner, the system 10 determines the presence of a 2 width bar. The remaining elements are subsequently analyzed in the same manner. Accordingly, using Equation (7), the bars and spaces present within the portion of the character being decoded may be resolved:

$$\#\text{ of unresolved elements} = \frac{(\text{width from run length}) - (\text{width from gray scale value})}{\text{minimum element size (known)}} \tag{7}$$

Using the above example, the number of unresolved or missing elements is calculated as: number of unresolved elements=(4−2)/1=2.

Once the widths have been resolved using gray scale composition analysis (step 914) the character is decoded (step 916). Upon resolving the width (step 914) the system 10 may determine that there are too many elements present. In this case, once a character having six elements is resolved (step 914) and decoded (step 916) the extra elements are carried over for further analysis (step 920). If there is more data present (step 918) the system 10 analyzes the next character (step 920) and the evaluation of that character is performed as described above. If no more data is present (step 918) the barcode symbol has been successfully decoded (step 922).

Although the invention has been described in part by making detailed reference to the preferred embodiment, such detail is intended to be instructive rather than restrictive. It will be appreciated by those skilled in the art that many variations may be made in the structure and mode of operation without departing from the spirit and scope of the invention as disclosed in the teachings herein.

What is claimed is:

1. A method for decoding a coded symbology having differing symbol widths representing encoded information, the method comprising:

generating scanned data representing a line crossing the coded symbology;

identifying individual symbol widths of the coded symbology based on in part a run length series of values of the scanned data;

decoding the scanned data based on in part the identified symbol widths to determine resolvable portions of the encoded information;

determining characteristics of the scanned values associated with each differing width corresponding to the resolvable portions; and decoding the scanned data corresponding to portions of the encoded information which were not determined to be resolvable based on in part the width characteristics; and wherein the step of decoding the not resolvable encoded information is based on in part comparing for each identified symbol width in the not resolved portions with a width for that symbol determined based on in part the width characteristics.

2. The method of claim 1 wherein the width characteristics are magnitudes of the scanned data values.

3. The method of claim 1 wherein the scanned data values are gray scale values.

4. The method of claim 3 wherein the width characteristics are gray scale value amplitude levels.

5. The method of claim 1 wherein the scanned data values are rankings of gray scale values.

6. The method of claim 1 wherein the step of identifying further comprises determining a run length series associated with a narrowest symbol width and each individual symbol width is identified by dividing that symbol's run length by the narrowest symbol width's run length.

7. The method of claim 1 wherein the step of comparing for each identified symbol width further comprises subtracting the width characteristic determined width from the identified symbol width to determine a number of missing symbol widths.

8. The method of claim 1 wherein the coded symbology is a barcode.

9. The method of claim 8 wherein the barcode is a Code 128 barcode.

10. An apparatus for decoding a coded symbology having differing symbol widths representing encoded information, the apparatus comprising:

means for generating scanned data representing a line crossing the coded symbology;

means for identifying individual symbol widths of the coded symbology based on in part a run length series of values of the scanned data;

means for decoding the scanned data based on in part the identified symbol widths to determine resolvable portions of the encoded information;

means for determining characteristics of the scanned values associated with each differing width corresponding to the resolvable portions; and means for decoding the scanned data corresponding to portions of the encoded information which were not determined to be resolvable based on in part the width characteristics; and wherein the decoding means decodes the not resolvable encoded information based on in part comparing for each identified symbol width in the not resolved portions with a width for that symbol determined based on in part the width characteristics.

11. The apparatus of claim 10 wherein the width characteristics are magnitudes of the scanned data values.

12. The apparatus of claim 10 wherein the scanned data values are gray scale values.

13. The apparatus of claim 12 wherein the width characteristics are gray scale value amplitude levels.

14. The apparatus of claim 10 wherein the scanned data values are rankings of gray scale values.

15. The apparatus of claim 10 wherein the identifying means further comprises means for determining a run length series associated with a narrowest symbol width and each individual symbol width is identified by dividing that symbol's run length by the narrowest symbol width's run length.

16. The apparatus of claim 10 wherein the decoding means further comprises means for each identified symbol for subtracting the width characteristics determined width from the identified symbol width to determine a number of missing symbol widths.

17. The apparatus of claim 10 wherein the coded symbology is a barcode and the generating scanned data means is a charge coupled device detector.

18. The apparatus of claim 17 wherein the barcode is a Code 128 barcode.

19. A method for decoding a coded symbology having differing symbol widths representing encoded information, the method comprising:

generating scanned data representing a line crossing the coded symbology;

identifying individual symbol widths of the coded symbology based on in part a run length series of values of the scanned data;

decoding the scanned data based on in part the identified symbol widths to determine resolvable portions of the encoded information;

determining characteristics of the scanned values associated with each differing width corresponding to the resolvable portions; and decoding the scanned data corresponding to portions of the encoded information which were not determined to be resolvable based on in part the width characteristics; and wherein the decoding means decodes the not resolvable encoded information based on in part comparing for each identified symbol width in the not resolved portions with a width for that symbol determined based on in part the width characteristics.

* * * * *

UNITED STATES PATENT AND TRADEMARK OFFICE

CERTIFICATE OF CORRECTION

PATENT NO. : 6,193,158 B1
DATED : February 27, 2001
INVENTOR(S) : Hecht et al.

It is certified that error appears in the above-identified patent and that said Letters Patent is hereby corrected as shown below:

Column 5,
Line 4, before the word "LEVEL", insert therefor -- WHITE --.

Signed and Sealed this

Second Day of October, 2001

*Attest:*

Nicholas P. Godici

NICHOLAS P. GODICI
*Acting Director of the United States Patent and Trademark Office*

*Attesting Officer*